United States Patent [19]

Kabuo

[11] Patent Number: 5,636,155

[45] Date of Patent: Jun. 3, 1997

[54] ARITHMETIC PROCESSOR AND ARITHMETIC METHOD

[75] Inventor: Hideyuki Kabuo, Osaka, Japan

[73] Assignee: Matsushita Electric Industrial Co., Ltd., Osaka, Japan

[21] Appl. No.: 233,270

[22] Filed: Apr. 26, 1994

[30] Foreign Application Priority Data

Apr. 27, 1993 [JP] Japan .................................. 5-100903

[51] Int. Cl.$^6$ ........................................... G06F 7/52
[52] U.S. Cl. ................................................... 364/760
[58] Field of Search ..................... 364/736, 754, 364/757, 758, 760, 786, 787

[56] References Cited

U.S. PATENT DOCUMENTS

| | | | |
|---|---|---|---|
| 4,727,507 | 2/1988 | Miyanaga | 364/760 |
| 4,769,780 | 9/1988 | Chang | 364/760 |
| 4,864,528 | 9/1989 | Nishiyama et al. | 364/754 |
| 5,220,525 | 6/1993 | Anderson et al. | 364/760 |
| 5,231,415 | 7/1993 | Hagihara | 364/760 |
| 5,253,195 | 10/1993 | Broker et al. | 364/760 |

*Primary Examiner*—Chuong D. Ngo
*Attorney, Agent, or Firm*—McDermott, Will & Emery

[57] ABSTRACT

An arithmetic processor employs two modes of nonpipeline operation and pipeline operation, and is provided with a redundant binary multiplication part for generating redundant binary multiplied results and a supplementary term, first to third intermediate latches for storing two pairs of partial product added results and the supplementary term, a redundant binary accumulation part for accumulating the results of first to third intermediate latches and a value of an accumulation result latch to store the thus accumulated result into the accumulation result latch, and a redundant binary/binary conversion part for converting into a binary numeral the result of the redundant binary multiplication part or the result of the redundant binary accumulation part. Thereby high-speed operations of multiplication instruction and product-sum operation instruction are achieved.

17 Claims, 13 Drawing Sheets

| C | CA | CS | t0 | t1 | t2 |
|---|---|---|---|---|---|
| -1 | 1 | 1 | 0 | 1 | 0 |
| 0 | 0 | 0 | 0 | 0 | 1 |
| 1 | 1 | 0 | 1 | 0 | 0 |

ARITHMETIC PROCESSOR AND ARITHMETIC METHOD

BACKGROUND OF THE INVENTION

This invention relates to an improvement of an arithmetic processor for executing multiplication and product-sum operation, and particularly relates to an arithmetic processor and an arithmetic method for high-speed execution of multiplication instructions and product-sum operation instructions.

Recently, a high-speed DSP (digital signal processor) is being developed as a hardware for executing high-speed digital signal processing for enormous data in fields of communication and image processing. Particularly, high speed multiplier and accumulator are contemplated for executing in high speed product-sum operation instructions which are the most frequently used in the DSP. As a product-sum arithmetic processor built in a conventional DSP, a multiplier and an adder for accumulation are in pipeline construction (refer to, for example, ISSCC Technical paper, 1993, pp.-28–29).

One example of the above-mentioned conventional product-sum arithmetic processor is explained, with reference to drawings. In FIG.12 of block diagram showing the conventional product-sum arithmetic processor, reference numeral 101 denotes a multiplier for outputting one pair of multiplied results generated by adding partial products in a carry save adder. 102 denotes a carry lookahead adder (hereinafter referred to as CLA) for adding and converting into a binary numeral output results of the multiplier 101. 103 denotes an accumulation part for accumulating outputs of the CLA 102. 104 denotes a storage for supplying a source operand to the multiplier 101.

Also, 110–113 are latches, wherein 110 is a first input latch for storing a multiplier factor Y, 111 is a second input latch for storing a multiplicand X, 112 is an intermediate latch for storing the output result of the CLA 102, and 113 is an accumulation result latch for storing a result of the accumulation part 103 and for forwarding the own output to the accumulation part 103. 114 is a selector for selecting and outputting one of an output of the intermediate latch 112 and an output of the accumulation result latch 113.

The operation of the thus constructed product-sum arithmetic processor is explained next.

In case of execution of a multiplication instruction, the selector 114 is operated, according to a decoded result of the instruction, to output the output of the intermediate latch 112 as an output of the product-sum arithmetic processor. One pair of source operands (X, Y) are selected and outputted from the storage 104.

Next, the pair of source operands (X, Y) are supplied respectively through first and second input latches 110,111 to the multiplier 101 to generate a pair of multiplied results. The output result of the multiplier 101 is added in the CLA 102.

Then, the output result of the CLA 102 is latched to the intermediate latch 112 to be outputted through the selector 114.

In case of executing a product-sum operation instruction, the selector 114 is operated, according to a decoded result of the instruction, to output the output of the accumulation result latch 113 as an output of the product-sum arithmetic processor. One pair of source operands (X0, Y0) are selected and outputted from the storage 104.

Next, the source operands (X0, Y0) are supplied respectively through first and second input latches 110, 111 to the multiplier part 101 to generate a pair of multiplied results. The output result of the multiplier 101 is added in the CLA 102.

Then, the output result of the CLA 102 is latched to the intermediate latch 112 and supplied to the accumulation part 103 for addition, together with the output of the accumulation result latch 113.

The output of the accumulation part 103 is latched to the accumulation result latch 113 and outputted through the selector 114.

As to a multiplier constructing the product-sum arithmetic processor, there is a redundant binary multiplier as a conventional high-speed multiplier.

One example of the conventional redundant binary multiplier is explained, with reference to drawings.

FIG.13 is a block diagram of a conventional 16×16 redundant binary multiplier. In FIG.13, reference numerals 130–133 denote respectively first to fourth partial product generation circuit arrays (hereinafter referred to as first to fourth PPG arrays). 140 denotes a record circuit of Booth.

Reference numerals 120–123 denote redundant binary adder arrays (hereinafter referred to as RBA arrays) for adding redundant binary numerals and for generating a redundant binary output (combination of sign and absolute value or of positive output and negative output). Wherein 120 is a first RBA array for generating a result on upper digit side, 121 is a second RBA array for generating a result on lower digit side, 122 is a third RBA array for adding a result of the first RBA array 120 and a result of the second RBA array 121, and 123 is a fourth RBA array for adding a result of the third RBA array 122 and a supplementary term generated by the first PPG array 130. The partial product generation circuit array for generating a partial product and a supplementary term, the record circuit of Booth, and the redundant binary adder array are disclosed in U.S. Pat. No. 4,864,528 to Nishiyama et al.

The operation of the thus constructed redundant binary multiplier is explained below.

A 16-digit multiplier factor supplied from the first input latch 110 is converted into eight pairs of record values in the Booth's record circuit. First to fourth PPG arrays 130–133 generates four partial products and four supplementary terms, using the eight pairs of record values and a multiplicand supplied from the second input latch 111. Each supplementary term absorbs, in the addition in the redundant binary expression, a carry at a one-digit upper digit from a certain digit without exception so as not to propagate the carry to further upper digits, namely so as to propagate the carry to only one digit. In the second RBA array 121, the partial product and the supplementary term which are generated by the fourth PPG array 133 and the partial product generated by the third PPG array 132 are added. In the first RBA array 120, also, the supplementary term generated by the third PPG array 132, the partial product and the supplementary term which are generated by the second PPG array 131 and the partial product generated by the first PPG array are added. Next, in the third RBA array 122, the outputs of first and second RBA arrays 120,121 are added. Finally, in the fourth RBA array 123, the output of the third RBA array 122 and the supplementary term generated by the first PPG array 1SO are added, thereby an output in redundant binary numeral is obtained.

In the conventional product-sum arithmetic processor in FIG.8, however, the processing time of the multiplier 101 is the longest of those of the respective circuits, such as the CLA. Therefore, the operation speed of the multiplier restrains the high speed arithmetic operation.

Further, in the above conventional redundant binary multiplier with a binary tree adder construction shown in FIG. 13, in case where a multiplier factor is a multiple of 4, the fourth RBA array 123 for adding the supplementary term at the most significant digit of output of the third RBA array 122 is required, which involves one-stage increase of addition stages.

SUMMARY OF THE INVENTION

The present invention has its object of executing in high speed multiplication instructions and product-sum operation instructions in an arithmetic processor for executing multiplication or product-sum operation, using a redundant binary multiplier and of preventing increase in number of gate stages for addition of the supplementary term at the most significant digit in the redundant binary multiplier.

To attain the above object, the present invention takes a matter into consideration that a carry lookahead adder is used for conversion into a binary numeral from a multiplied result in redundant binary expression after multiplication of the redundant binary numerals. Calculation of propagation and generation of a carry in the carry lookahead adder is conducted considering the supplementary term at the most significant digit in the redundant binary multiplier so as to correspond to the addition of the supplementary term at the most significant digit in the redundant binary multiplier.

In this case, in the present invention, in multiplication of redundant binary numerals and the product-sum operation for accumulating the multiplied results, the operation time for the product-sum operation is reduced.

In detail, an arithmetic processor for multiplication in the present invention comprises:

a redundant binary multiplication part for generating one pair of redundant binary multiplier results and one supplementary term; and a redundant binary/binary conversion part for directly calculating a propagation and a generation, using the supplementary term generated by said redundant binary multiplication part and for executing redundant binary/binary conversion of an output of said redundant binary multiplication part, using thus calculated propagation and generation.

In a product-sum operation, in addition to the above construction, the arithmetic processor further comprises an accumulation part arranged between said redundant binary multiplication part and said redundant binary/binary conversion part, wherein said accumulation part executes an addition of a redundant binary multiplied result of said redundant binary multiplication part and an accumulation value, the accumulation value being an output of said redundant binary/binary conversion part that an added result of said accumulation part is redundant binary/binary-converted.

An arithmetic method which executes a nonpipeline operation in case of execution of a multiplication instruction and a pipeline operation in case of executing of a product-sum operation instruction, said nonpipeline operation comprises the steps of:

generating one pair of redundant binary multiplied results and one supplementary term;

directly calculating a propagation and a generation, using the supplementary term according to the pair of redundant binary multiplied results; and executing redundant binary/binary conversion by executing an adding processing thereof, and said pipeline operation comprising the steps of;

generating a partial product added result on lower side of a multiplier factor on lower side and a multiplicand, a partial product added result on upper side of the multiplier factor on upper side and a multiplicand, and one supplementary term at a first stage;

executing redundant binary addition of said two pairs of partial product added results, the supplementary term and a past accumulation value at a second stage;

repeating the multiplication processing and accumulation processing respectively at said first stage and said second stage by times specified according to the product-sum operation instruction; and converting into a binary numeral a redundant binary accumulation result after accumulation processing by the times specified according to the product-sum operation instruction at said third stage.

Under the above constructions, in the arithmetic processors respectively for performing multiplication of redundant binary numerals and for performing product-sum operation of binary numerals, after one pair of redundant binary multiplied results and one supplementary term are generated by the redundant binary multiplication part, the redundant binary/binary conversion part calculates propagation and generation, taking account of influence according to the supplementary term, to convert the redundant binary multiplied result of the redundant binary multiplication part into a binary numeral. Thereby, the redundant binary numerals can be multiplied without addition of the supplementary term at the most significant digit in the redundant binary multiplication part. Thus, the gate for addition of the supplementary term at the most significant digit in the redundant binary multiplication part is unnecessary, which reduces the number of gate stages. In addition, at the calculation of propagation and generation, the influence according to the supplementary term is considered. Since the almost the same time required for calculating propagation and generation is required as the time required in conventional one, the time for conventional addition of the supplementary term at the most significant digit is unnecessary, with a result of high speed generation of multiplied result.

According to the above arithmetic method, in case of multiplication instruction in nonpipeline operation mode, after one pair of redundant binary multiplied results and one supplementary term are generated, propagation and generation are calculated directly, considering the influence according to the supplementary term, to convert the redundant binary numeral into a binary numeral. Thus, the conventional time required for addition of the supplementary term at the most significant digit is unnecessary, with a result of high speed generation of the multiplied result. On the other hand, in case of product-sum operation instruction in pipeline operation mode, the first stage is performed to generate two pairs of partial product added results and one supplementary term, the two pairs of partial product added results, the supplementary term and a past accumulation value are accumulated in redundant binary expression at the second stage, then only the conversion of the redundant binary result which is finally accumulated at the second stage into a binary numeral is performed at the third stage. Accordingly, the operation times of first and second stages approximate each other, thus enhancing a clock frequency and speeding up the operation.

BRIEF DESCRIPTION OF THE DRAWINGS

Accompanying drawings show preferred embodiments of the present invention, in which.

DETAILED DESCRIPTION OF THE INVENTION

Description is made below about preferred embodiments of the present invention, with reference to the accompanying drawings.

(FIRST EMBODIMENT)

Figure 1:
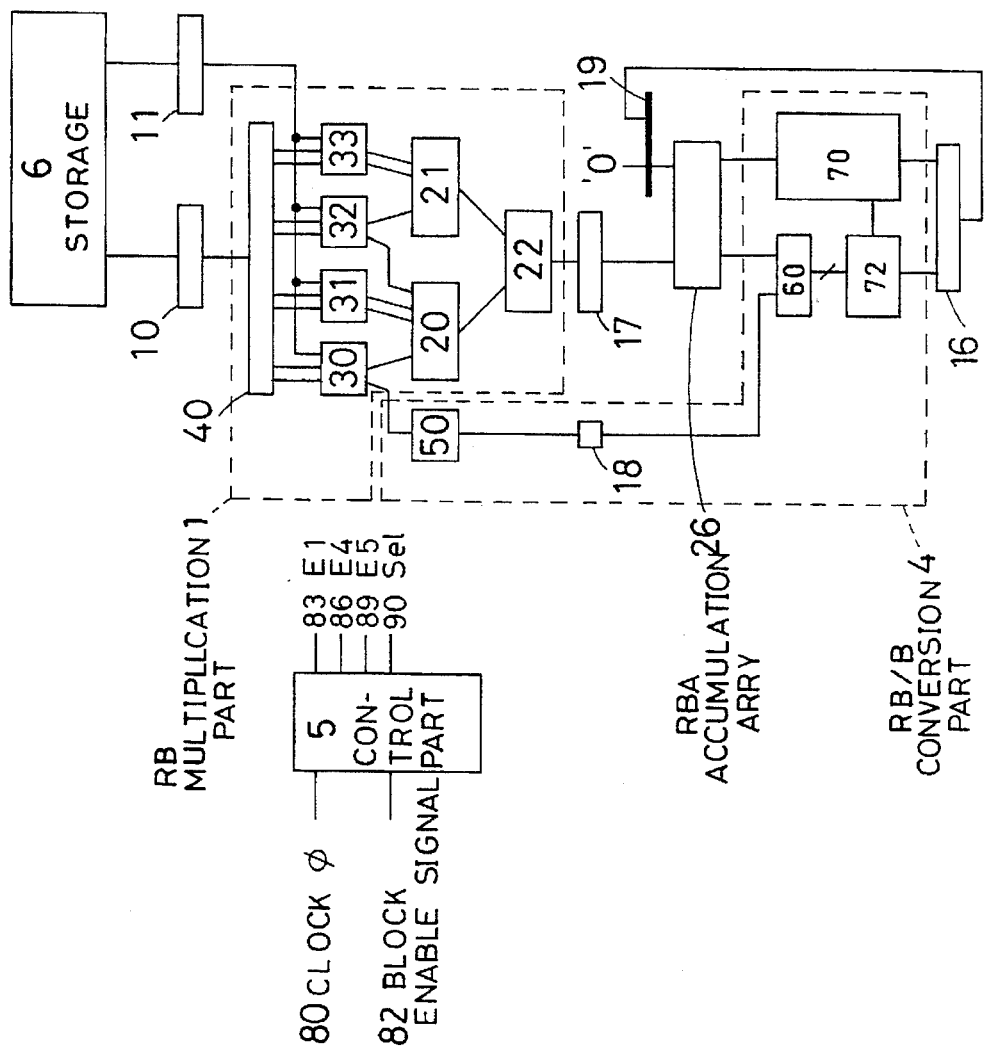
FIG. 1 is a block diagram of an arithmetic processor for executing multiplication according to a first embodiment.

FIG. 1 is a block diagram of an arithmetic processor according to the first embodiment of the present invention.

In FIG. 1, reference numeral 1 denotes a redundant binary multiplication part (hereinafter referred to as RB multiplication part) for generating one pair of redundant binary multiplied results and one supplementary term. 4 denotes a redundant binary/binary conversion part (hereinafter referred to at RB/B conversion part). 5 denotes a control part for controlling enable signals to latches. 6 denotes a storage for supplying a source operand to the RB multiplication part 1.

Reference numerals 10, 11 and 16–18 are latches. Wherein, 10 is a first input latch for storing a multiplier factor Y, 11 is a second input latch for storing a multiplicand X, 16 is an output latch for storing an output of the RB/B conversion part 4, 17 is a multiplied result intermediate latch for latching one pair of redundant binary multiplied results which are the output of the RB multiplication part 1, and 18 is a supplementary term & conversion selection signal latch for latching a supplementary term which is the output of the RB multiplication part 1 and conversion selection signals which are the outputs of the conversion selection signal generating part 50 (discussed later).

Reference numeral 19 denotes an accumulation array input selector for selecting an output from the output latch 16 or "0" and providing the thus selected one to a RBA accumulation array discussed later.

Reference numerals 20–22 and 26 denote redundant binary adder arrays (hereinafter referred to as RBA arrays), which composes a redundant binary adder tree, for adding redundant binary numerals to generate a redundant binary output (which is a combination of a sign and an absolute value at upper digits of 16th to 40th digits and a combination of a positive output and a negative output at lower digits of first to 15th digits, where the most significant digit of the supplementary term is 16th digit). Wherein, 20 is a first RBA array for generating a result on the upper digit side of the RB multiplication part 1, 21 is a second RBA array for generating a result on the lower digit side of the RB multiplication part 1, 22 is a third RBA array for adding a result of the first RBA array 20 and a result of the second RBA array 21 to output the thus added result as an output of the RB multiplication part 1, and 26 is the RBA accumulation array for adding an output result of the multiplied result intermediate latch 17 and an output result of the selector 19.

Reference numerals 30–33 denote respectively first to fourth partial product generation circuit arrays (hereinafter referred to as first to fourth PPG arrays). 40 denotes a record circuit of Booth.

Each of the four PPG arrays 30–33 generates a partial product and a supplementary term, using a record value supplied from the record circuit 40 and a multiplicand supplied from the second input latch 11. The second RBA array 21 executes an addition of the partial product and the supplementary term which are generated by the fourth PPG array 33 and the partial product generated by the third PPG array 32. The first RBA array 20 executes an addition of the supplementary term generated by the third PPG array 32, the partial product and the supplementary term which are generated by the second PPG array 31 and the partial product generated by the first PPG array 30. The third RBA array 22 executes an addition of the outputs of first and second RBA arrays 20, 21. Accordingly, the output of the RB multiplication part 1 is composed of one pair of redundant binary numerals outputted from the third RBA array 22 and the supplementary term outputted from the first PPG array 30.

Reference numeral 50 denotes a conversion selection signal generating part, built in the RB/B conversion part 4, for selecting an influence according to the supplementary term C generated by the RB multiplication part 1 (i.e., the first PPG array 30) at the conversion of the redundant binary numeral into a binary numeral in the RB/B conversion part 4.

Reference numeral 80 denotes a clockΦ. 82 denotes a block enable signal. 83 denotes an enable signal E1 to first and second input latches 10, 11. 86 is an enable signal E4 to the output latch 16. 89 is an enable signal E5 to the multiplied result intermediate latch 17 and the supplementary term latch 18.

Figure 2:
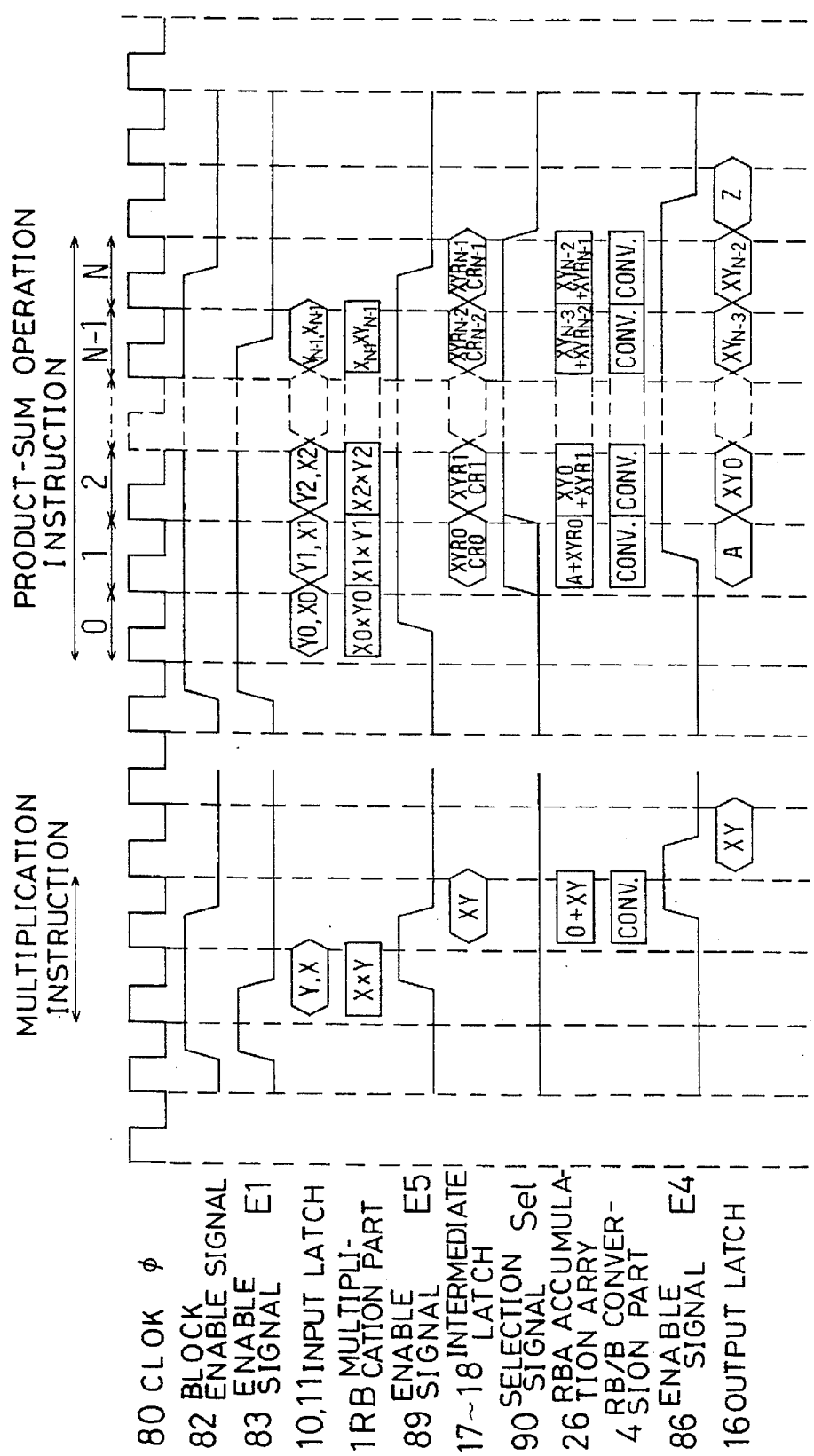
FIG. 2 is a timing chart for explaining the operation in the first embodiment.

FIG. 2 is a timing chart of the arithmetic processor according to the first embodiment.

The operation of the thus constructed arithmetic processor is discussed next, with reference to FIGS. 1 and 2.

In case where a multiplication instruction is executed, the accumulation array input selector 19 is operated, according to a decoded result of the instruction, to input "0" to the RB/B conversion part 4 of the RBA accumulation array 26. The control part 5 sets the enable signals E1 (83), E5 (89) to HIGH upon receipt of the block enable signal 82. The storage 6 selects and outputs one pair of source operands (X, Y).

Then, first and second input latches 10, 11 respectively latch the source operands (X, Y) at a rise of the clockΦ (80), the RB multiplication part 1 executes a multiplication regarding the source operands (X, Y) to generate one pair of redundant binary multiplied results and one supplementary term. The output result XYR and the supplementary term CR of the RB multiplication part 1 are respectively supplied to the multiplied result intermediate latch 17 and the supplementary term latch 18.

Subsequently, the multiplied result intermediate latch 17 and the supplementary term latch 18 respectively latch the output result XYR and the supplementary term CR of the RB multiplication part 1 at a rise of the clockΦ (80). After "0", the output from the selector 19, is added to the output result XYR in the RBA accumulation array 26, the output result XYR is forwarded to the RB/B conversion part 4 to be converted into a binary numeral XY, using the supplementary term CR, then is supplied to the output latch 16. The control part 5 sets the enable signal E4 (86) to HIGH.

Finally, the output latch 16 receives the enable signal E4 (86), and latches the calculated result XY at a rise of the clockΦ (80).

Hereinafter described in detail is the binary numeral conversion operation of the RB/B conversion part 4.

Figure 5:
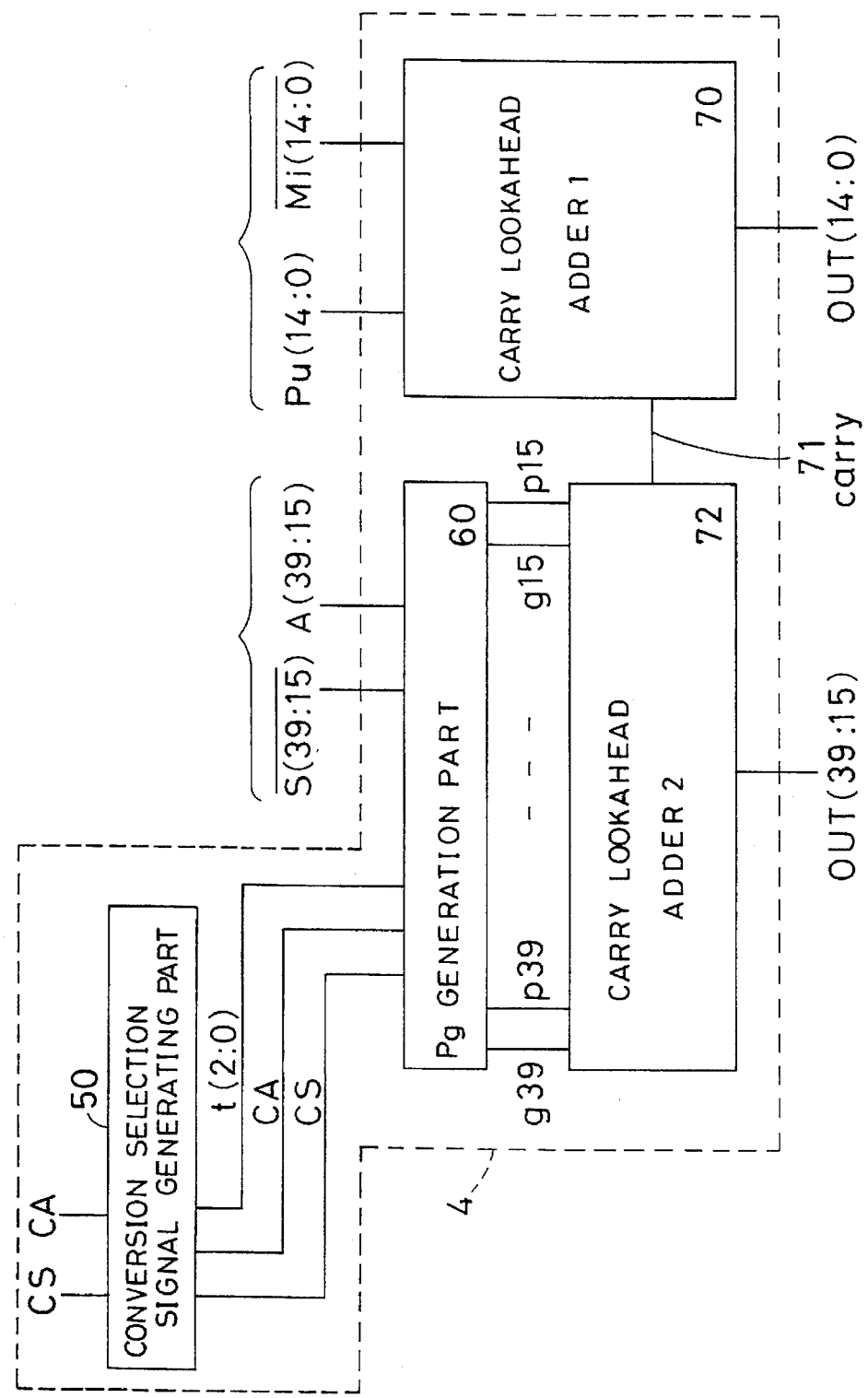
FIG. 5 is a block diagram of a redundant binary/binary conversion part in the first embodiment.

FIG. 5 is a block diagram of the RB/B conversion part 4 in this embodiment.

In FIG. 5, reference numeral 70 denotes a carry lookahead adder (hereinafter referred to as CLA1) for executing an addition of lower 15 digits of i=0–14 in a 40-digit redundant binary numeral. 60 denotes a pg generation part for calculating a propagation p and a generation g directly from three of: the redundant binary numeral of upper 25 digits of i=15 (16th digit where the supplementary term at the most significant digit is positioned)–39; the supplementary term C generated by the RB multiplication part 1 (i.e., first PPG array 30); and the output of the conversion selection signal generating part 50. 71 denotes a carry signal outputted from the CLA1 (70). 72 denotes another carry lookahead adder (hereinafter referred to as CLA2) for executing an addition, using the outputs p, g of the pg generation part 60 and the carry signal 71 of the CLA1 (70). 50 denotes the foregoing conversion selection signal generating part.

Figure 6:
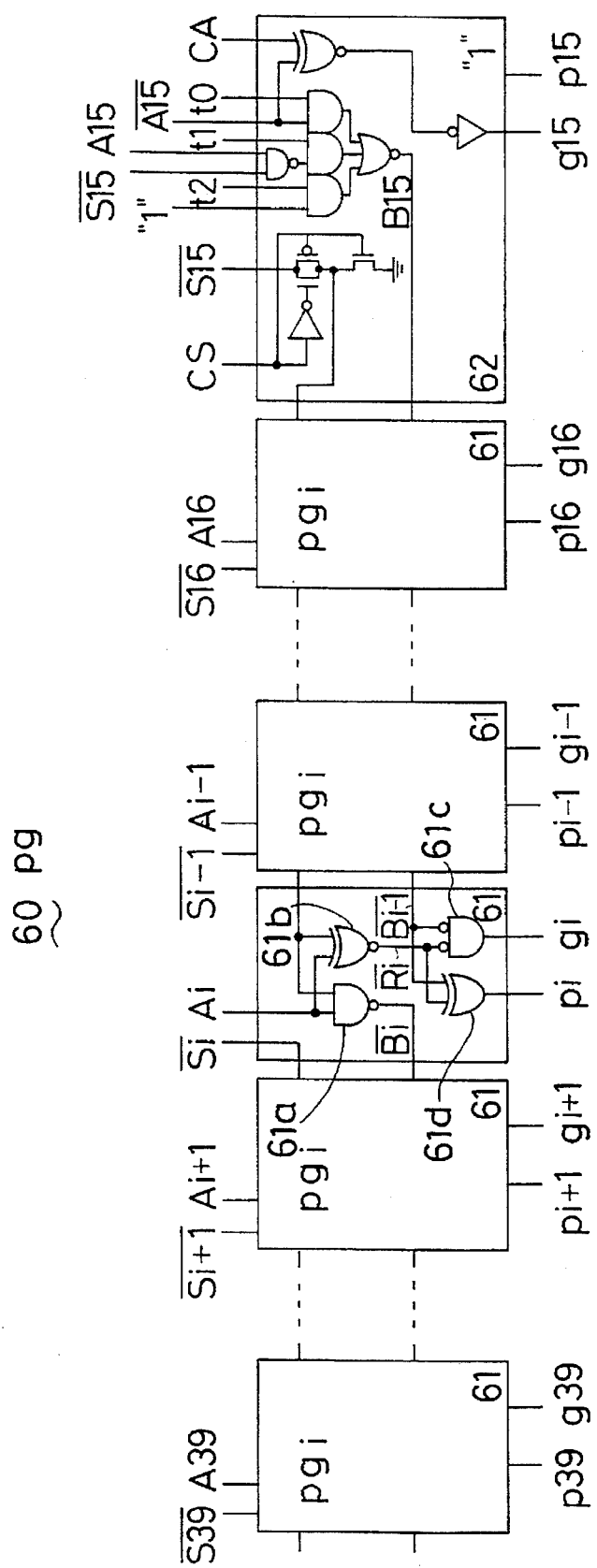
FIG. 6 is a logical circuit diagram of a pg generation part in the first embodiment.

FIG. 6 is a detailed logical circuit diagram of the generation part 60 in FIG. 5.

In FIG. 6, reference numeral 61 denotes each of a plurality (24) of pgi generation cells for calculating a propagation pi and a generation gi at i-th digit (i=16 (one-digit upper digit of supplementary term at most significant digit)–39) according to an inversion of a sin Si of a redundant binary numeral and an absolute value Ai thereof, and an inversion of an intermediate carry signal Bi-1 from the one-digit lower digit than the i-th digit. 62 denotes a pg15 generation cell for calculating a propagation p15 and a generation g15 at the 16th digit (i=15, digit position of supplementary term at most significant digit) according to an inversion of a sign S15 of the redundant binary numeral and an absolute value A15 thereof, an output t (2:0) of the conversion selection signal generating part 50, and a sign CS of the supplementary term and an absolute value CA thereof.

Figures 7A, 7B:
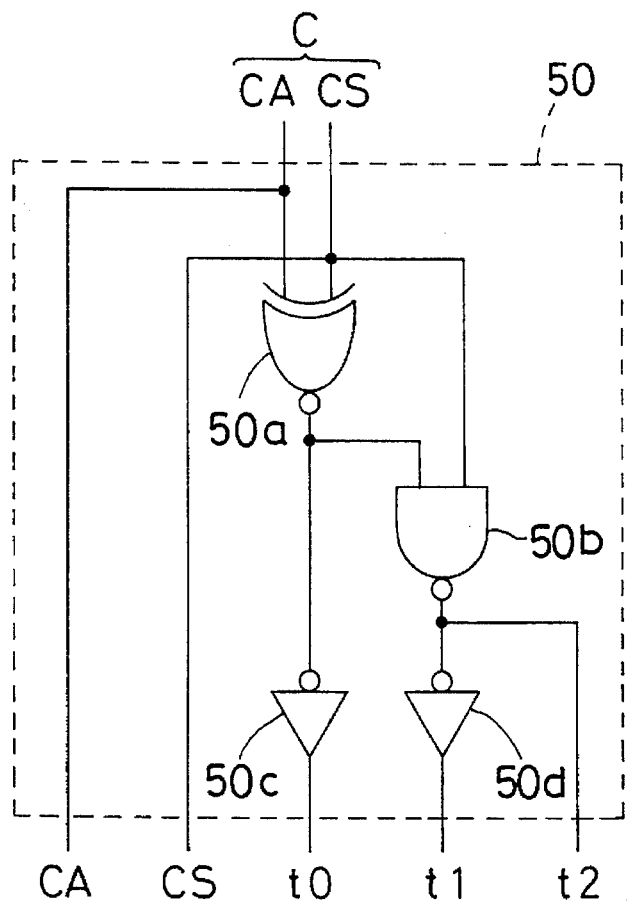
FIG. 7(a) is a logical circuit diagram of a conversion selection signal generating part in the first embodiment.
FIG. 7(b) is a drawing indicating a relation between inputs CA, CS and outputs t0, t1, t2 in a conversion selection signal generating part.

FIG. 7 is a logical circuit diagram of the conversion selection signal generating part 50, which is composed of one exclusive logical sum 50a, one logical product 50b and two inverters 50c, 50d.

Below discussed in detail is the binary conversion operation of the RB/B conversion part 4 in this embodiment.

The binary conversion is performed by two processes.

First, because the supplementary term C generated by the first PPG array 30 is positioned at the 16th digit, counting from the least significant digit, the lower 15 digits are converted into a binary numeral by a subtraction of positive and negative outputs outputted from the third RBA array 22.

In the second process, the propagation p and the generation g are calculated from the redundant binary numeral expressed by the sign and the absolute value for upper digits from 16th digit and the supplementary term.

The redundant binary numeral is expressed by the positive output Plus and the negative output Minus for the 15th digit and digits below the 15th digit and by the sign S and the absolute value A for the 16th digit and digits above the 16th digit. However, the redundant binary numeral may be expressed by either methods for all digits.

Considering the propagation of influence according to the supplementary term, an intermediate sum Ri and an intermediate carry Bi are generated according to the redundant binary input Mi. The relation among the redundant binary input Mi, the sign Si of lower digits, the intermediate sum Ri and the intermediate carry Bi is indicated in Table 1.

TABLE 1

| Mi | Si | Ri | Bi |
|----|----|----|----|
| 1  | 1  | 0  | 1  |
|    | 0  | 1  | 0  |
| 0  | 1  | 1  | 0  |
|    | 0  | 0  | 0  |
| −1 | 1  | 0  | 1  |
|    | 0  | 1  | 0  |

The value at the i-th digit is obtained by subtracting 1 from a sum of the intermediate sum Ri at the i-th digit and the intermediate carry Bi-1 at i-1-th digit. The value thereof is expressed by a positive value plus and a negative value minus. For binary conversion, a subtraction of the positive value plus and the negative value minus are executed.

Accordingly, the propagation pi and the generation gi at the i-th digit are respectively expressed by following equations (1), (2):

$$pi = EXOR(Ri, Bi\text{-}1) \qquad (1)$$

$$gi = Ri \cdot Bi\text{-}1 \qquad (2)$$

Accordingly, with respect to an arbitrary i-th digit between the most significant digit and the digit at the supplementary term at the most significant digit in the binary numeral composed of the absolute value A and the sign S, each pgi generation cell (pg generation part) 61 of i=16–39 uses, as shown in FIG.6, the logical product 61a of the absolute value Ai at the i-th digit and the inversion of the sign Si at i-1-th digit as the intermediate carry Bi, the exclusive logical sum 61b of the absolute value Ai at i-th digit and the inversion of the sign Si at i-1-th digit as the intermediate sum Ri, the logical product 61c of the intermediate sum Ri at i-th digit and the intermediate carry Bi-1 at the i-1-th digit as the generation gi, and the exclusive logical sum 61d of the intermediate sum Ri at the i-th digit and the intermediate carry Bi-1 at the i-1-th digit as the propagation pi.

According to the value of the supplementary term C, the relation between the intermediate carry B15 and the sign S15 at the 16th digit is as indicated in Table 2.

TABLE 2

| C | S15 | B15 |
|---|---|---|
| 1 | S15 | $\overline{A15}$ |
| 0 | S15 | 1 |
| −1 | 1 | $\overline{A15 \cdot S15}$ |

In accordance with the relations of Tables 1 and 2 and of the equations (1) and (2), the propagation and the generation are calculated in the pg generation part 60.

Next, using the propagation, the generation and the carry signal 71 of CLA1 (70), an ordinary addition is performed in the CLS2 (72) for the binary conversion.

To perform the above two processes in parallel means to execute the redundant binary/binary conversion.

An example of successive product-sum operation in N times is discussed next.

A general product-sum operation is expressed in an equation (3):

$$Z = A + \Sigma Xi \cdot Yi (i = 0 - N - 1) \quad (3)$$

The value A in the equation (3) is selective from "0" and the value of the output latch 16 according to the instruction.

For executing a product-sum operation instruction, the accumulation array input selector 19 is first operated, according to a decoded result of the instruction, to supply "0" or the value of the output latch 16 to the RB/B conversion part 4 of the RBA accumulation array 26. The storage 6 selects and outputs one pair of source operands (Y0, X0). The control part 5 sets the enable signals E1 (83), E5 (89) to HIGH upon receipt of the block enable signal 82.

In cycle 0, first and second input latches 10, 11 respectively latch the source operands (Y0, X0) at the rise of the clockΦ (80). The RB multiplication part 1 multiplies the source operands, namely multiplies the multiplier factor Y0 and the multiplicand X0, and generates the redundant binary multiplied results XYR0 and one supplementary term CR0 to supply them respectively to the multiplied result intermediate latch 17 and the supplementary term latch 18. The storage 6 supplies next operands (Y1, X1) respectively to first and second input latches 10, 11.

In cycle 1, first and second input latches 10, 11 respectively latch the source operands (Y1, X1) at the rise of the clockΦ (80), and the multiplied result intermediate latch 17 and the supplementary term latch 18 respectively latch the redundant binary multiplied results XYR0 and the supplementary term CR0. The RB multiplication part 1 multiplies the source operands (Y1, X1), namely multiplies the multiplier factor Y1 and the multiplicand X1, and generates the redundant binary multiplied results XYR1 and one supplementary term CR1 to supply them respectively to the multiplied result intermediate latch 17 and the supplementary term latch 18. After "0" or the value of the output latch 16 is added to the redundant binary multiplied results XYR0 in the RBA accumulation array 26 via the accumulation array input selector 19, the redundant binary multiplied results XYR0 are forwarded to the RB/B conversion part 4 to be converted into the binary numerals XY0, using the supplementary term CR0, then are supplied to the output latch 16. The storage 6 supplies next source operands (Y2, X2) respectively to first and second input latches 10, 11. The control part 5 sets the enable signal E4 (86) to HIGH.

In cycle 2, first and second input latches 10, 11 respectively latch the source operands (Y2, X2) at the rise of the clockΦ (80), the multiplied result Intermediate latch 17 and the supplementary term latch 18 respectively latch the redundant binary multiplied results XYR1 and the supplementary term CR1, and the output latch 16 latches the binary numerals XY0. The RB multiplication part 1 multiplies the source operands (Y1, X1), namely multiplies the multiplier factor Y1 and the multiplicand X1, and generates the redundant binary multiplied results XYR1 and one supplementary term CR1 to supply them respectively to the multiplied result intermediate latch 17 and the supplementary term latch 18. After the value of the output latch 16 is added to the redundant binary multiplied results XYR0 in the RBA accumulation array 26 via the accumulation array input selector 19, the redundant binary multiplied results XYR0 are forwarded to the RB/B conversion part 4 to be converted into the binary numerals XY1, using the supplementary term CR0, then are supplied to the output latch 16. The storage 6 supplies next source operands (Y2, X2) respectively to first and second input latches 10, 11.

In cycles 3–N−1, the same processings are performed as in the cycle 2.

In cycle N, the multiplied result intermediate latch 17 and the supplementary term latch 18 respectively latch the redundant binary multiplied results XYRN-1 and the supplementary term CRN-1 at the rise of the clockΦ (80). After the value of the output latch 16 is added to the redundant binary multiplied results XYRN-1 In the RBA accumulation array 26 via the accumulation array input selector 19, the redundant binary multiplied results XYRN-1 are forwarded to the RB/B conversion part 4 to be converted into the binary arithmetic result Z, using the supplementary term CRN-1, then are supplied to the output latch 16.

Finally, the output latch 16 latches the arithmetic result Z at the rise of the clockΦ (80).

As described above, according to this embodiment, the arithmetic processor is provided with the RB multiplication part for generating one pair of redundant binary multiplied results and one supplementary term, the redundant binary adder for executing the addition of the redundant binary multiplied results and the accumulation value, and the RB/B conversion part for selecting the influence according to the supplementary term at the redundant binary/binary conversion of the output of the redundant binary adder and for calculating directly the propagation and the generation. Thereby, the gate stage for supplementary term addition in the redundant binary multiplication part is reduced in number, achieving high speed arithmetic operation.

(SECOND EMBODIMENT)

Figure 3:
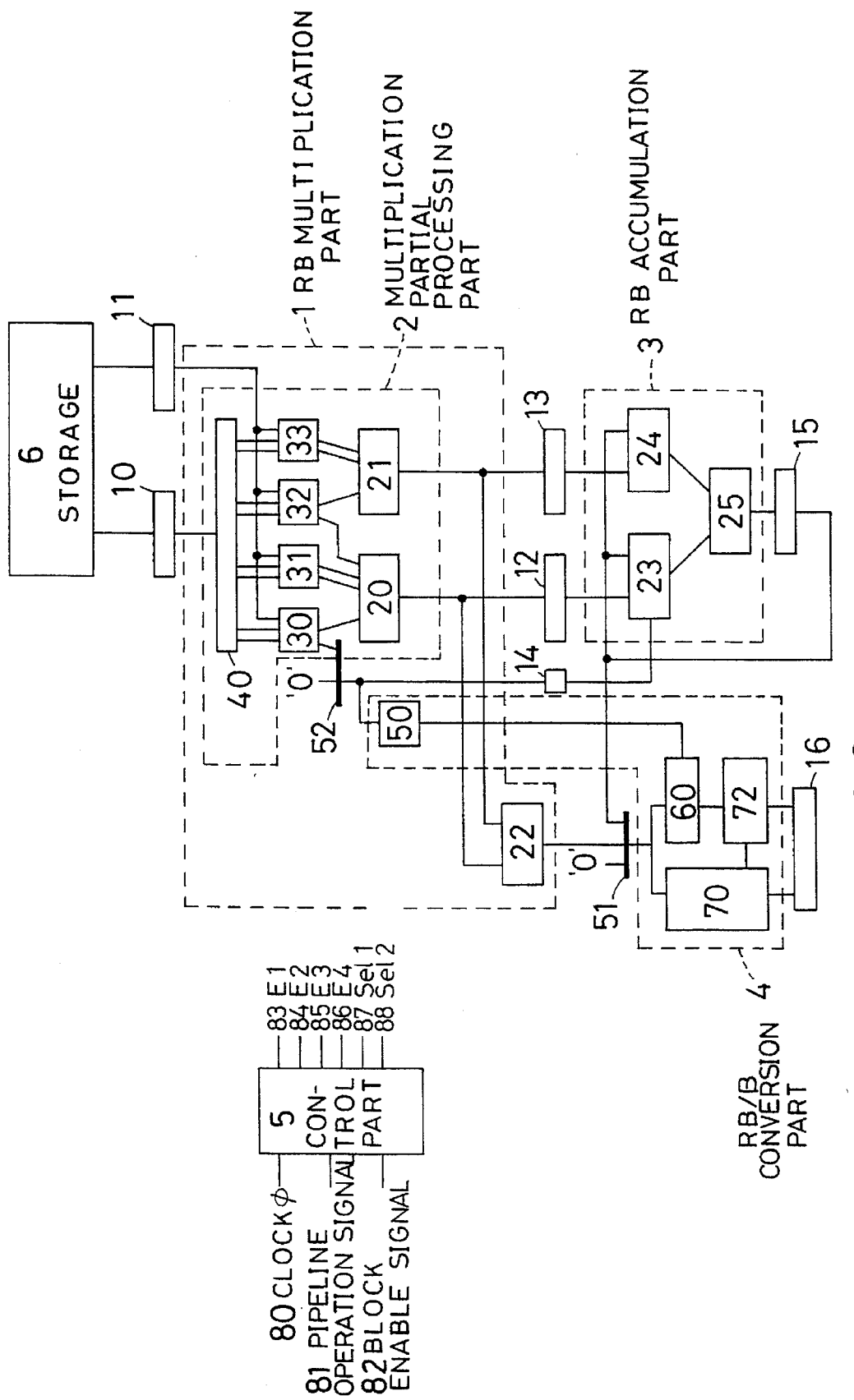
FIG. 3 is a block diagram of an arithmetic processor for executing product-sum operation according to a second embodiment.
Figure 4:
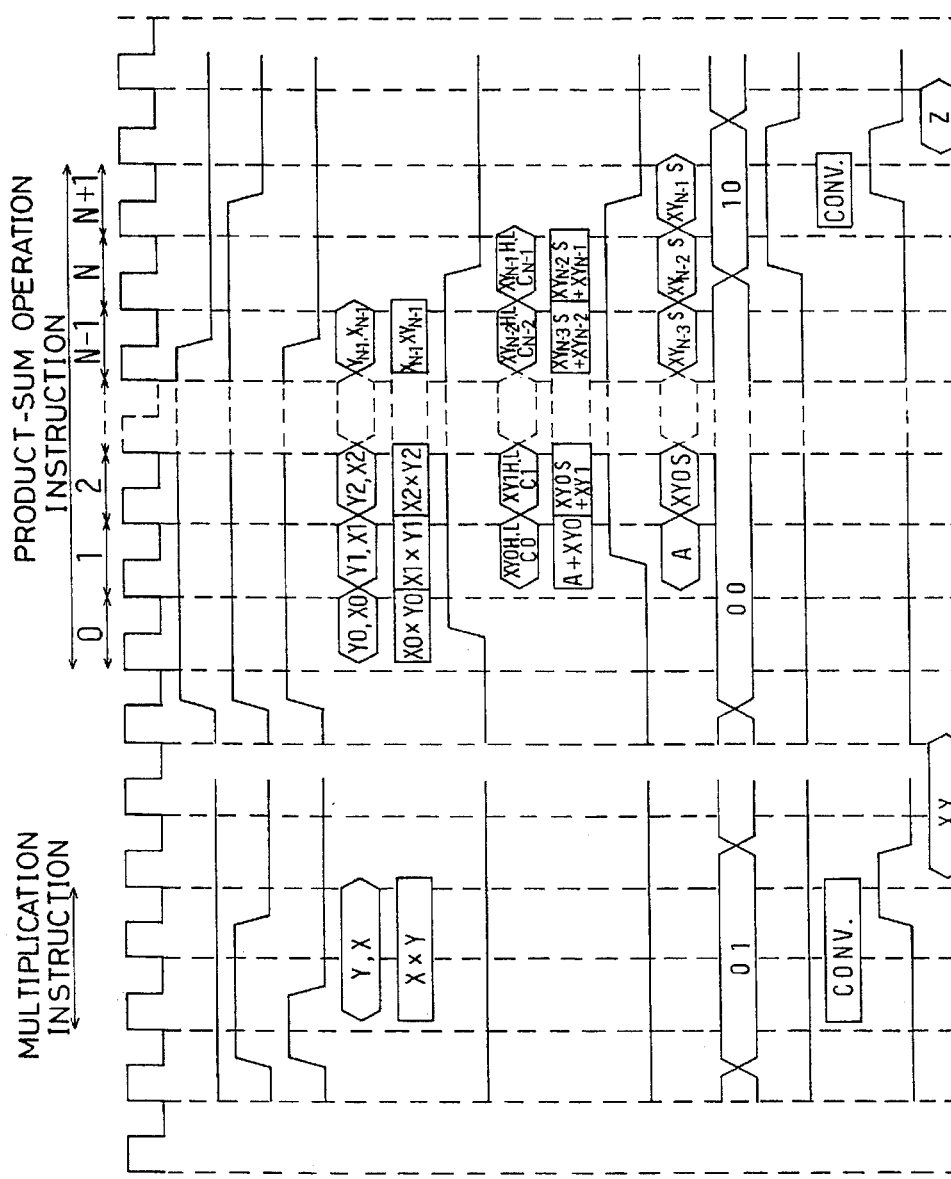
FIG. 4 is a timing chart for explaining the operation in the second embodiment.

Hereinafter discussed with reference FIGS. 3 and 4 is the second embodiment of the present invention.

FIG. 3 is a block diagram of a product-sum arithmetic processor according to the second embodiment. In FIG. 3, reference numeral 1 denotes a redundant binary multiplication part (hereinafter referred to as RB multiplication part) for generating one pair of redundant binary multiplied results and one supplementary term. 2 denotes a multiplication partial processing part for outputting two pairs of partial product added results which are intermediate results in the RB multiplication part 1. 3 denotes a redundant binary accumulation part (hereinafter referred to as RB accumulation part) for executing an accumulation of output results of the multiplication partial processing part 2. 4 denotes a redundant binary/binary conversion part (hereinafter referred to as RB/B conversion part) for converting the output result of the RB multiplication part 1 or the RB accumulation part 3 into a binary numeral. 5 denotes a control part for controlling the whole product-sum arithmetic processor in pipeline operation mode and nonpipeline operation mode. 6 denotes a storage for supplying a source operand to the RB multiplication part 1.

Reference numerals 10–16 are latches, wherein 10 is a first input latch for storing a multiplier factor Y, 11 is a second input latch for storing a multiplicand X, 12 is a first intermediate latch for storing a result on upper digit side of the multiplication partial processing part 2, 13 is a second intermediate latch for storing a result on lower digit side of the multiplication partial processing part 2, 14 is a third intermediate latch for storing a supplementary term of the multiplication partial processing part 2, 15 is an accumulation result intermediate latch, having a resetting function, for storing a result of the RB accumulation part 3 and forwarding the own output to the RB accumulation part 3 or the RB/B conversion part 4, and 16 is an output latch for storing an output of the RB/B conversion part 4.

Reference numerals 20–25 denote redundant binary adder arrays (hereinafter referred to as RBA arrays), wherein 20 is a first RBA array for generating a result on upper digit side of the multiplication partial processing part 2, 21 is a second RBA array for generating a result on lower digit side of the multiplication partial processing part 2, 22 is a third RBA array for adding a result of the first RBA array and a result of the second RBA array to input the thus added result to the RB/B conversion part 4, 23 is a fourth RBA array for executing an addition of the result on upper digit side of the multiplication partial processing part 2, a value on upper digit side of the output of the accumulation result intermediate latch 15 and an output of the third intermediate latch 14, 24 is a fifth RBA array for executing an addition of the result on lower digit side of the multiplication partial processing part 2 and a value on lower digit side of the output of the accumulation result intermediate latch 15, and 25 is a sixth RBA array for executing an addition of an output of the fourth RBA array and an output of the fifth RBA array to forward the thus added result to the accumulation result intermediate latch 15.

Reference numerals 30–33 denote respectively first to fourth partial product generation circuit arrays (hereinafter referred to as PPG arrays). 40 denotes a record circuit of Booth.

Reference numeral 50 denotes a conversion selection signal generating part for selecting an influence according to the supplementary term at binary conversion in the RB/B conversion part 4. 51 denotes a RB/B conversion part input selector for selecting one among an output result of the RB multiplication part 1, an output result of the accumulation result intermediate latch 15 and "0" to supply the thus selected one to the RB/B conversion part 4. 52 denotes a supplementary term selector for compellingly setting the supplementary term to "0".

Reference numerals 80–88 denote input/output signals to the control part 5. Wherein 80 is a clockΦ, 81 is a pipeline operation signal for directing execution of pipeline operation or nonpipeline operation, 82 is a block enable signal, 83 is an enable signal E1 to first and second input latches 10, 11, 84 is an enable signal E2 to first to third intermediate latches 12–14, 85 is an enable signal E3 to the accumulation result intermediate latch 15, 86 is an enable signal E4 to the output latch 16, 87 is a selection signal Sel1 to the RB/B conversion part input selector 51, and 88 is a selection signal Sel2 to the supplementary term selector 52. The selection signal Sel1 selects "0" as an output of the selector 51 when Sel1="00", selects the output of the third RBA array 22 as an output of the selector 51 when Sel1="01" and selects the output of the accumulation result intermediate latch 15 as an output of the selector 51 when Sel1="10". The selection signal 88 selects the output of the first PPG array 30 as an output of the supplementary term selector 52 when Sel2 is set to LOW and selects "0" as an output of the supplementary term selector 52 when Sel2 is set to HIGH.

FIG. 4 is a timing chart of the product-sum arithmetic processor according to the second embodiment.

The operation of the thus constructed product-sum arithmetic processor is described next, with reference to FIGS. 3 and 4.

Initially, the output signals of the control part 5 are all set to LOW.

In case of multiplication instruction, the pipeline operation signal 81 is set to LOW according to a decoded result of the instruction. Upon receipt of the pipeline operation signal 81 and the block enable signal 82, the control part 5 sets the enable signal E1 (83) to HIGH and operates the RB/B conversion part input selector 51 to input the output of the third RBA array 22 to the RB/B conversion part 4. Also, the storage 6 selects and outputs one pair of source operands (X,Y).

Next, first and second input latches 10, 11 respectively latch the source operands (X, Y) at a rise of the clockΦ (80), and the RB multiplication part 1 multiplies the source operands to generate redundant binary multiplied results XYR and one supplementary term C.

Subsequently, the redundant binary multiplied results XYR are inputted to the RB/B conversion part 4 via the RB/B conversion part input selector 51 to be converted into the binary numerals XY, using the supplementary term C, then are supplied to the output latch 16.

The control part 5 sets the enable signal E4 (86) to HIGH after two clocks from a rise of the enable signal E1 (83).

Upon receipt of the enable signal E4 (86), the output latch 16 latches the arithmetic results XY at a rise of the clockΦ (80).

Next discussed is the subsequent product-sum operation in N times.

The value of the equation (3) is selective from "0" and the value of the accumulation result intermediate latch 15 according to the instruction.

In ease of product-sum operation instruction, first, the pipeline operation signal 81 is set to HIGH according to a decoded result of the instruction. Upon receipt of the pipeline operation signal 81 and the block enable signal 82, the control part 5 sets the enable signal E1 (88) to HIGH. The RB/B conversion input selector is operated to input "0" to the RB/B conversion part 4. In ease where the value A of the equation (3) is "0", the value of the accumulation result intermediate latch 15 is set to "0" by forwarding a reset signal. Also, the storage 6 selects and outputs one pair of source operands (Y0, X0).

In cycle 0, first and second input latches 10, 11 respectively latch the multiplier factor Y0 and the multiplicand X0 at the rise of the clockΦ (80), and the RB multiplication part executes the multiplication and generates one pair of redundant binary multiplied results (XY0H, XY0L) and one supplementary term C0 to supply the thus generated ones respectively to first to third intermediate latches 12–14. The storage g supplies next source operands (Y1, X1) respectively to first and second input latches 10, 11. The control part 5 sets the enable signal E2 (84) to HIGH.

In cycle 1, first and second input latches 10, 11 respectively latch the multiplier factor Y1 and the multiplicand X1 at the rise of the clockΦ (80), and first to third intermediate latches 12–14 respectively latch the redundant binary multiplied results (XY0H, XY0L) and the supplementary term C0. The RB multiplication part 1 executes the multiplication of the multiplier factor Y1 and the multiplicand X1, and generates one pair of redundant binary multiplied results (XY1H, XY1L) and one supplementary term C1 to supply the thus generated ones respectively to first to third intermediate latches 12–14. The RB accumulation part 3 executes the addition of the redundant binary multiplied results (XY0H, XY0L), the supplementary term C0 and the value latched by the accumulation result intermediate latch 15 to supply the thus added result XY0S to the accumulation result intermediate latch 15. The storage 8 supplies next source operands (Y2, X2) respectively to first and second input latches 10, 11. The control part 5 sets the enable signal E3 (85) to HIGH.

In cycle 2, first and second input latches 10, 11 respectively latch the multiplier factor Y2 and the multiplicand X2 at the rise of the clockΦ (80), first to third intermediate latches 12–14 respectively latch the redundant binary multiplied results (XY1H, XY1L) and the supplementary term C1, and the accumulation result intermediate latch 15 latches the added result XY0S. The RB multiplication part 1 executes the multiplication of the multiplier factor Y2 and the multiplicand X2 and generates one pair of redundant binary multiplied results (XY2H, XY2L) and one supplementary term C2 to supply the thus generated ones respectively to first to third intermediate latches 12–14. The RB accumulation part 3 executes the addition of the redundant binary multiplied results (XY1H, XY1L), the supplementary term C1 and the value XY0S latched by the accumulation result intermediate latch 15 to supply the thus added result XY1S to the accumulation result intermediate latch 15. The storage 6 supplies next source operands (Y3, X3) respectively to first and second input latches 10, 11.

In cycles 3–N–2, the same processings are performed as in the cycle 2.

In the cycle N–1, the same processings are preformed as in the cycle 2, except that the storage 6 does not supply next source operands and the control part 5 sets the enable signal E1 (83) to LOW.

In the cycle N, first to third intermediate latches 12–14 respectively latch the redundant binary multiplied results (XYN-1H, YXN-1L) and the supplementary term CN-1 at the rise of the clockΦ (80), and the accumulation result intermediate latch 15 latches the added result XYN-2S. The RB accumulation part 3 executes the addition of the redundant binary multiplied results (XYN-1H, XYN-1L), the supplementary term CN-1 and the value XYN-2S latched by the accumulation result intermediate latch 15 to supply the thus added result XYN-1S to the accumulation result intermediate latch 15. The control part 5 operates the RB/B conversion part input selector 51 to input the output of the accumulation result intermediate latch 15 to the R/B conversion part 4, operates the supplementary term selector 52 to select "0" and sets the enable signal E2 (84) to LOW.

In cycle N+1, the accumulation result intermediate latch 15 latches the added result XYN-1S at the rise of the clockΦ (80). The RB/B conversion part 4 receives the added result XYN-1S via the RB/B conversion part input selector 51, receives "0" as the supplementary term, and converts the redundant binary numeral into a binary numeral to obtain the arithmetic result Z. The control part 5 sets the enable signal E4 (86) to HIGH and the enable signal E3 (85) to LOW.

Finally, receiving the enable signal E4 (86), the output latch 16 latches the arithmetic result Z at the rise of the clockΦ (80).

As described above, the product-sum arithmetic processor in the second embodiment employs the two operation modes of pipeline operation and nonpipeline operation. In detail, the product-sum arithmetic processor is provided with the RB multiplication part for generating one pair of redundant binary multiplied results and one supplementary term, the pass for fetching out the two pairs of partial product added results generated as intermediate results in the redundant binary adder tree in the RB multiplication part, first to third intermediate latches for storing the two pairs of partial product added results, the RB accumulation part for accumulating the results of first to third intermediate latches and the value of the accumulation result latch to store the thus accumulated one into the accumulation result latch, and the RB/B conversion part for converting the result of the RB multiplication part or of the RB accumulation part into a binary numeral. Thereby the product-sum arithmetic processor is in the nonpipeline operation mode at the execution of multiplication instructions and in the pipeline operation mode at the execution of product-sum operation instructions. Thus, the gate stages for generating the multiplied results are reduced in number, time required for arithmetic operation of each pipeline stage is reduced and the gates in effective operation is reduced in number.

(THIRD EMBODIMENT)

Hereinafter discussed is the third embodiment of the present invention, with reference to FIGS. 8–10.

The third embodiment is an improvement of the second embodiment shown in FIG. 3, wherein the number of RBA arrays is reduced from four to three in the third embodiment with the same function, a multiplied result from the least significant digit to several upper digits which are determined at early stage during the multiplication is converted from a redundant binary numeral to a binary numeral at an intermediate stage of the multiplication for upper digits than them. Thereby, the redundant binary/binary conversion finally performed for the remaining upper digits is completed in short time, enhancing the execution speed of the multiplication instruction.

Figure 8:
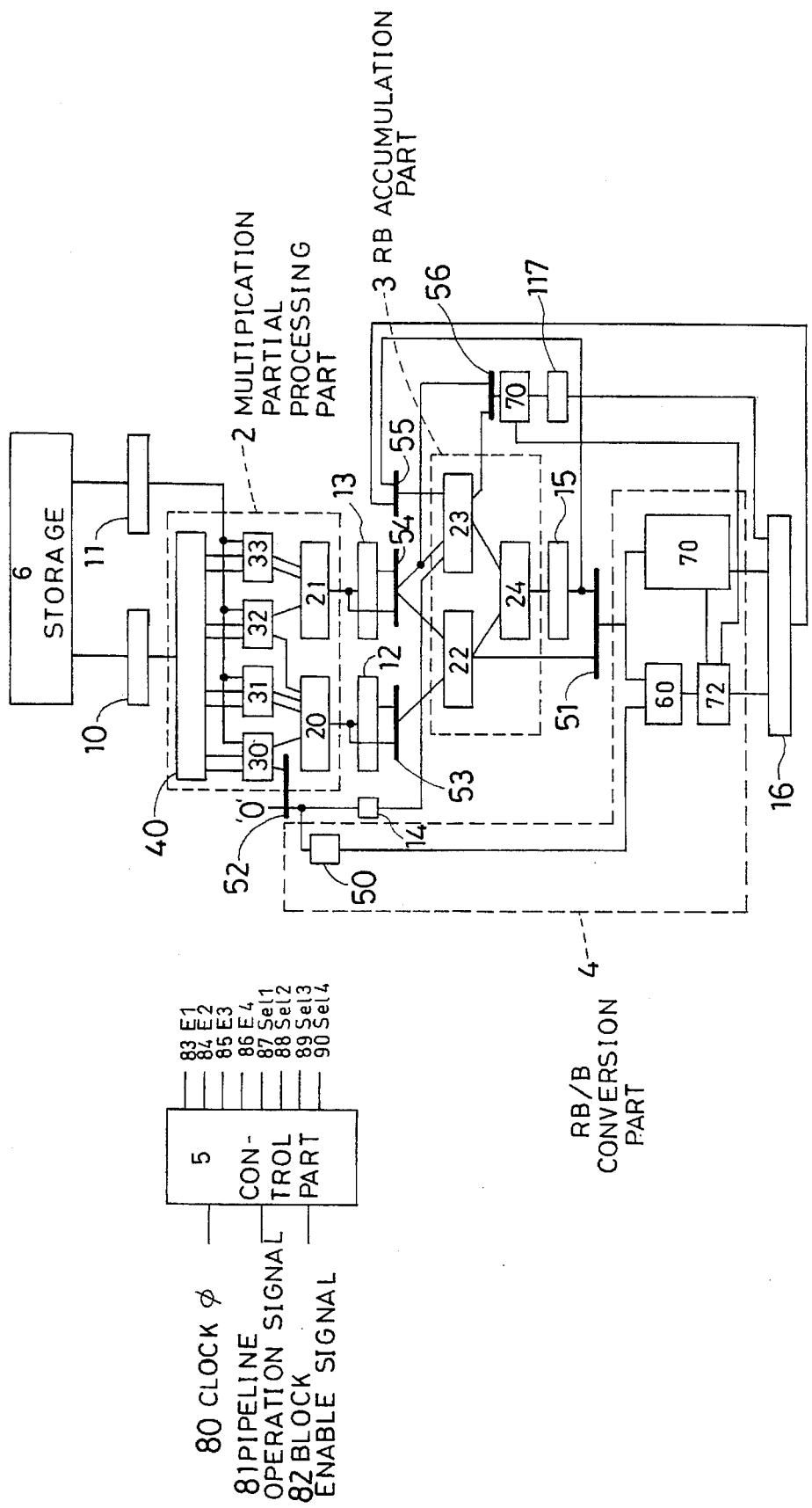
FIG. 8 is a block diagram of a product-sum arithmetic processor in a third embodiment of the present invention.

FIG. 8 is a block diagram of a product-sum arithmetic processor according to the third embodiment. In the figure, reference numeral 2 denotes a multiplication partial processing part for outputting two pairs of partial product added results and one supplementary term. 3 denotes a redundant binary accumulation part (hereinafter referred to as RB accumulation part) for accumulating output results of the multiplication partial processing part 2. 4 denotes a binary redundant/binary conversion part (hereinafter referred to as RB/B conversion part) for converting a redundant binary multiplied result or a redundant binary accumulation result to a binary numeral. 5 denotes a control part for controlling the whole product-sum arithmetic processor in pipeline operation mode and nonpipeline operation mode. 6 denotes a storage for supplying a source operand to the multiplication partial processing part 2.

Reference numerals 10–16 and 117 are latches, wherein 10 is a first input latch for storing a multiplier factor Y, 11 is a second input latch for storing a multiplicand X, 12 is a first intermediate latch for storing a result on upper digit side of the multiplication partial processing part 2, 13 is a second intermediate latch for storing a result on lower digit side of the multiplication partial processing part 2, 14 is a third intermediate latch for storing the supplementary term of the multiplication partial processing part 2, 15 is an accumulation result intermediate latch, having a reset function, for storing a result of the RB accumulation part 3 and for forwarding the own output to the RB accumulation part 3 or the RB/B conversion part 4, 16 is an output latch for storing an output of the RB/B conversion part 4, and 117 is a partial conversion output latch for storing an output of a partial conversion part 70 (discussed later).

Reference numerals 20–24 are redundant binary adder arrays (hereinafter referred to as RBA arrays), wherein 20 is a first RBA array for generating a multiplied result on upper digit side of the multiplication partial processing part 2, 21 is a second RBA array for generating a multiplied result on lower digit side of the multiplication partial processing part 2, 22 is a third RBA array for adding a result of the first RBA array 20 and a result of the second RBA array 21 to output the thus added result to the RB/B conversion part 4 or a fifth RBA array 24 (discussed later), 23 is a fourth RBA array for adding three of: a multiplied result of a part on lower digit side of the multiplication partial processing part 2; the supplementary term of the multiplication partial processing part 2; and an output of an input selector 55 (discussed later) (i.e. output of the accumulation result intermediate latch 15 or of the output latch 16), 24 is a fifth RBA array for adding an output of the third RBA array 22 and an output of the fourth RBA array 23 to forward the thus added result to the accumulation result intermediate latch 15.

Reference numerals 30–33 denote respectively first to fourth partial product generation circuit arrays (hereinafter referred to as PPG arrays). 40 denotes a record circuit of Booth.

Reference numeral 50 denotes a conversion selection signal generating part for selecting an influence according to the supplementary term at redundant binary/binary conversion in the RB/B conversion part 4.

Reference numeral 51–56 denote selectors, wherein 51 is a RB/B conversion part input selector for selecting the output of the third RBA array of the RB accumulation part 3 or the output of the accumulation result intermediate latch 15 to supply the thus selected output to the RB/B conversion part 4, 52 is a supplementary term selector for compellingly set the supplementary term to "0", 53 is a first RB accumulation part input selector for selecting the output of the first RBA array 20 or the output of the first intermediate latch 12 to output the thus selected output to the third RBA array 22, 54 is a second RB accumulation part input selector for selecting the output of the second RBA array 21 or the output of the second intermediate latch 13 to output the thus selected output to both the third RBA array 22 and the fourth RBA array 23, 55 is a third RB accumulation part input selector for selecting the output of the accumulation result intermediate latch 15 or the output of the output latch 16 to output the thus selected output to the fourth RBA array 23, and 56 is a partial conversion part input selector for selecting a result of a part on lower digit side of the multiplication partial processing part 2 (i.e. a part of the output of the second RBA array 21) or a part of the output of the fourth RBA array 23.

Reference numeral 70 denotes the partial conversion part for converging the output of the partial conversion part input selector 56 (i.e. a result of a part on lower digit side of the multiplication partial processing part 2 or a part of the output of the fourth RBA array 23) from a redundant binary numeral to a binary numeral.

Reference numerals 80–90 are input/output signals to the control part 5. 80 is a clockΦ, 81 is a pipeline operation signal for directing execution of pipeline operation or of nonpipeline operation, 82 is a block enable signal, 83 is an enable signal E1 to first and second input latches 10, 11, 84 is an enable signal E2 to first to third intermediate latches 12–14, 85 is an enable signal E3 to the accumulation result intermediate latch 15, and 86 is an enable signal E4 to the output latch 16.

87 is a selection signal Sel1 to the RB/B conversion part input selector 51, and 88 is a selection signal Sel2 to the supplementary term selector 52. The selection signal Sel1 (87) makes the RB/B conversion part input selector 51 select "0" as the output thereof when Sel1="00", select the output of the third RBA array 22 as the output thereof when Sel1="01", and select the output of the accumulation result intermediate latch 15 as the output thereof when Sel1="10". The selection signal Sel2 (88) makes the supplementary term selector 52 select the output of the first PPG array 30 as the output thereof when Sel2=LOW and select "0" as the output thereof when Sel2=HIGH.

Further, 89 is a selection signal Sel3 for making the third RB accumulation part input selector 55 select the output of the accumulation result intermediate latch 15 as the output thereof when Sel3=LOW and select the output of the output latch 16 as the output thereof when Sel3=HIGH. 90 is a selection signal Sel4 for making the partial conversion part input selector 56 select the output on lower digit side of the second intermediate latch 13 as the output thereof when Sel4=Low and select the output on lower digit side of the fourth RBA array 23 as the output thereof when Sel4=HIGH.

Described next is about the partial conversion part 70 for converting into a binary numeral the redundant binary data which are the second RB added result 155b on lower digit side and the fourth RB added result 157b on lower digit side.

Figure 11:
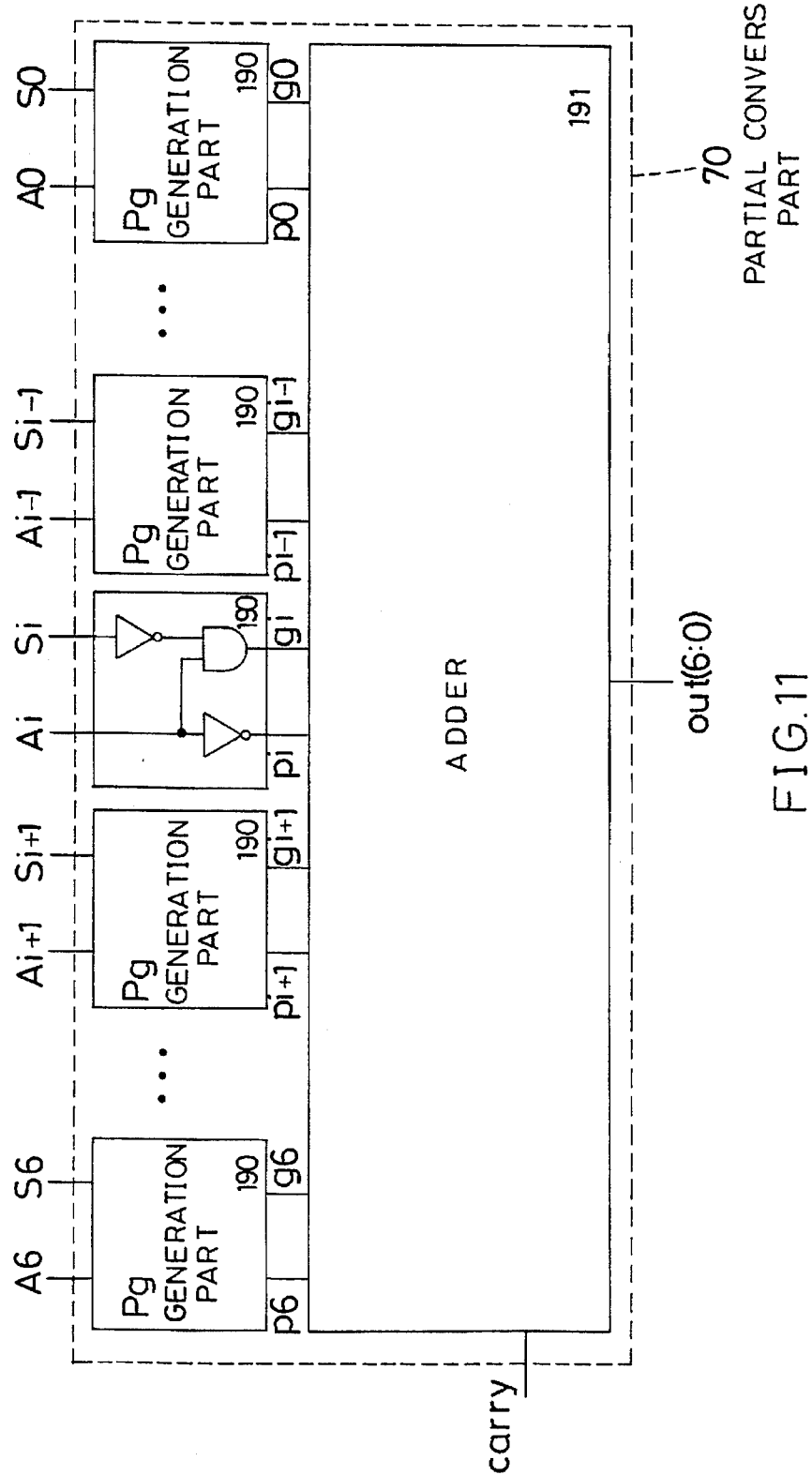
FIG. 11 is a block diagram of a partial conversion part in the third embodiment.
Figure 12:
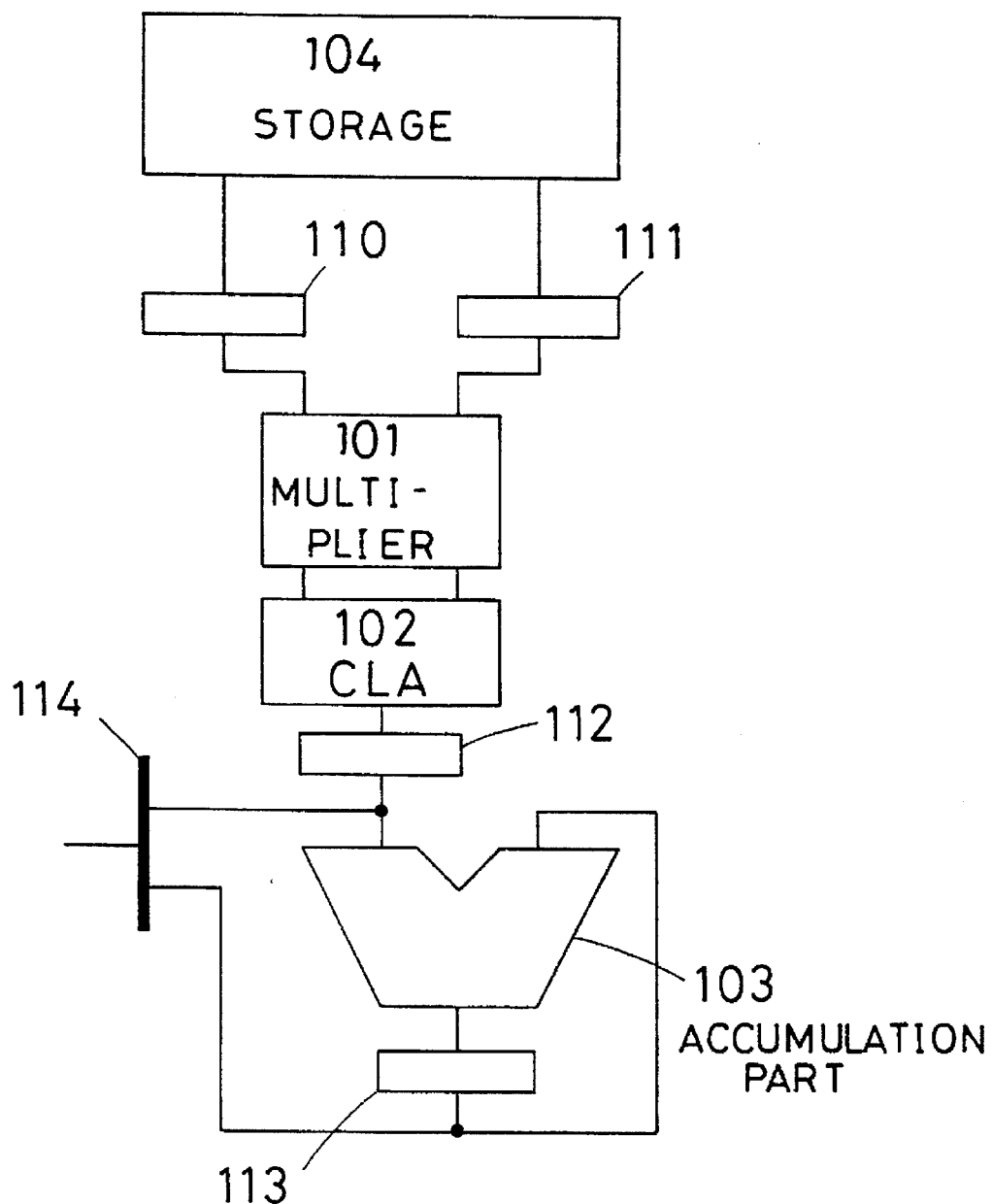
FIG. 12 is a block diagram of a conventional arithmetic processor for executing product-sum operation.
Figure 13:
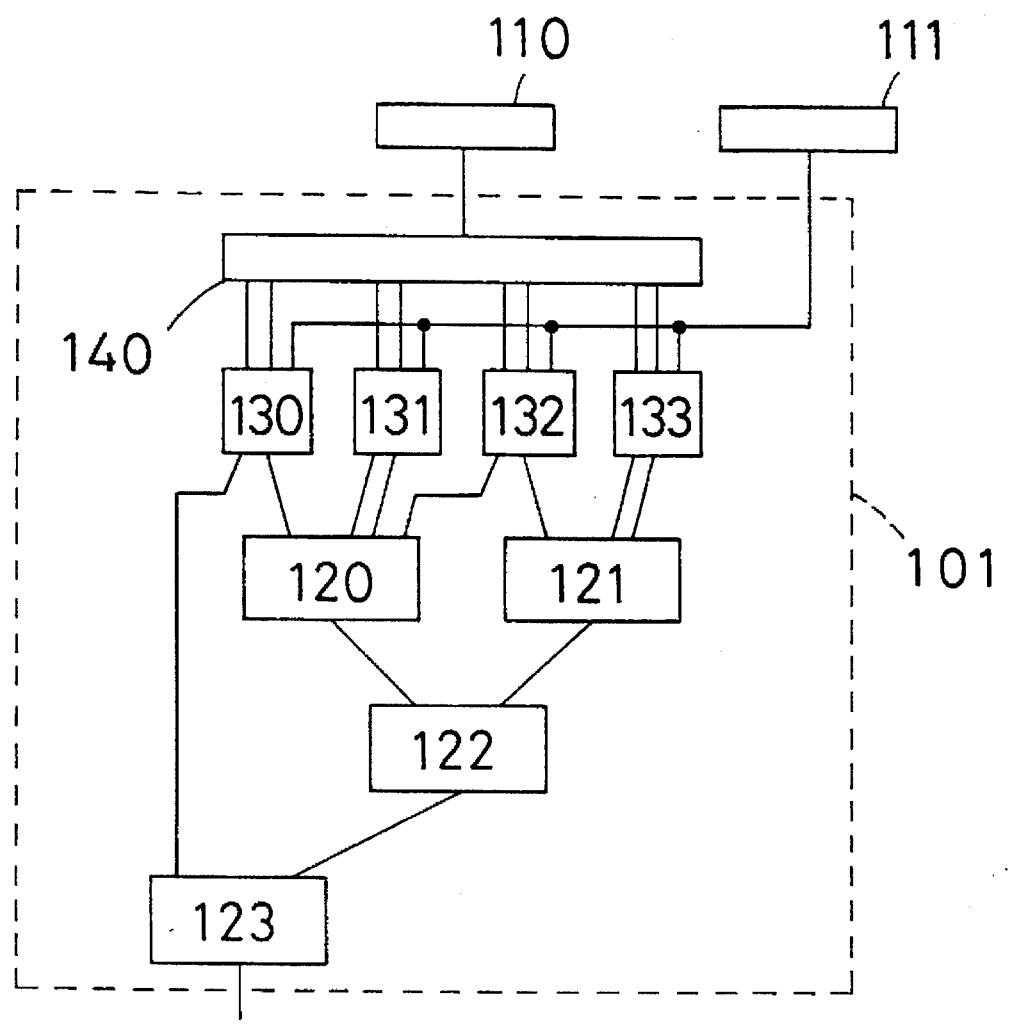
FIG. 13 is a block diagram of a conventional redundant binary multiplier.

FIG. 11 is a block diagram of the partial conversion part 70 in FIG. 8.

In the figure, reference numeral 190 denotes each of pg generation circuits of 1+1 in number (7 in the figure) for generating a propagation pi and a generation gi at i-th digit according to a sign Si and an absolute value Ai at i-th digit in a 7-digit redundant binary numeral from the partial conversion part input selector 56. 191 denotes an adder for executing an addition, using the propagations p and the generations g which are outputs of each pg generation circuit 190.

As mentioned above in the discussion of the redundant binary/binary conversion operation in the first embodiment, the redundant binary/binary conversion is performed by the subtraction of a positive value plus and a negative value minus. Taking account thereof, the propagation pi and the generation gi at the i-th digit are expressed in equations (4) and (5), using a pair of the sign Si and the absolute value Ai at i-th digit which express the redundant binary numeral.

$$pi = EXOR(\text{plus}, \overline{\text{minus}}) \qquad (4)$$
$$= \overline{Ai}$$

$$gi = \text{plus} \cdot \overline{\text{minus}} \qquad (5)$$
$$= \overline{Si} \cdot Ai$$

According to the relation between the equations (4), (5), each pg generation circuit 190 is provided with an inverter 190a for generating the propagation gi from the absolute value Ai, an inverter 190b for generating the generation gi from the sign Si and the absolute value Ai and a logical product 190c, and executes the conversion into a binary numeral the redundant binary numeral at the i-th digit which is composed of a pair of an absolute value and a sign.

The RB/B conversion part 4 in FIG. 8 in this embodiment is simpler than the RB/B conversion part 4 in FIG. 3 in the third embodiment by digits which the partial conversion part 70 supersede the redundant binary/binary conversion.

The operation of the multiplication instruction is as follows.

Detailed construction and operation of the product-sum arithmetic processor in the third embodiment is described next, with reference to FIGS. 8–10.

Figure 9:
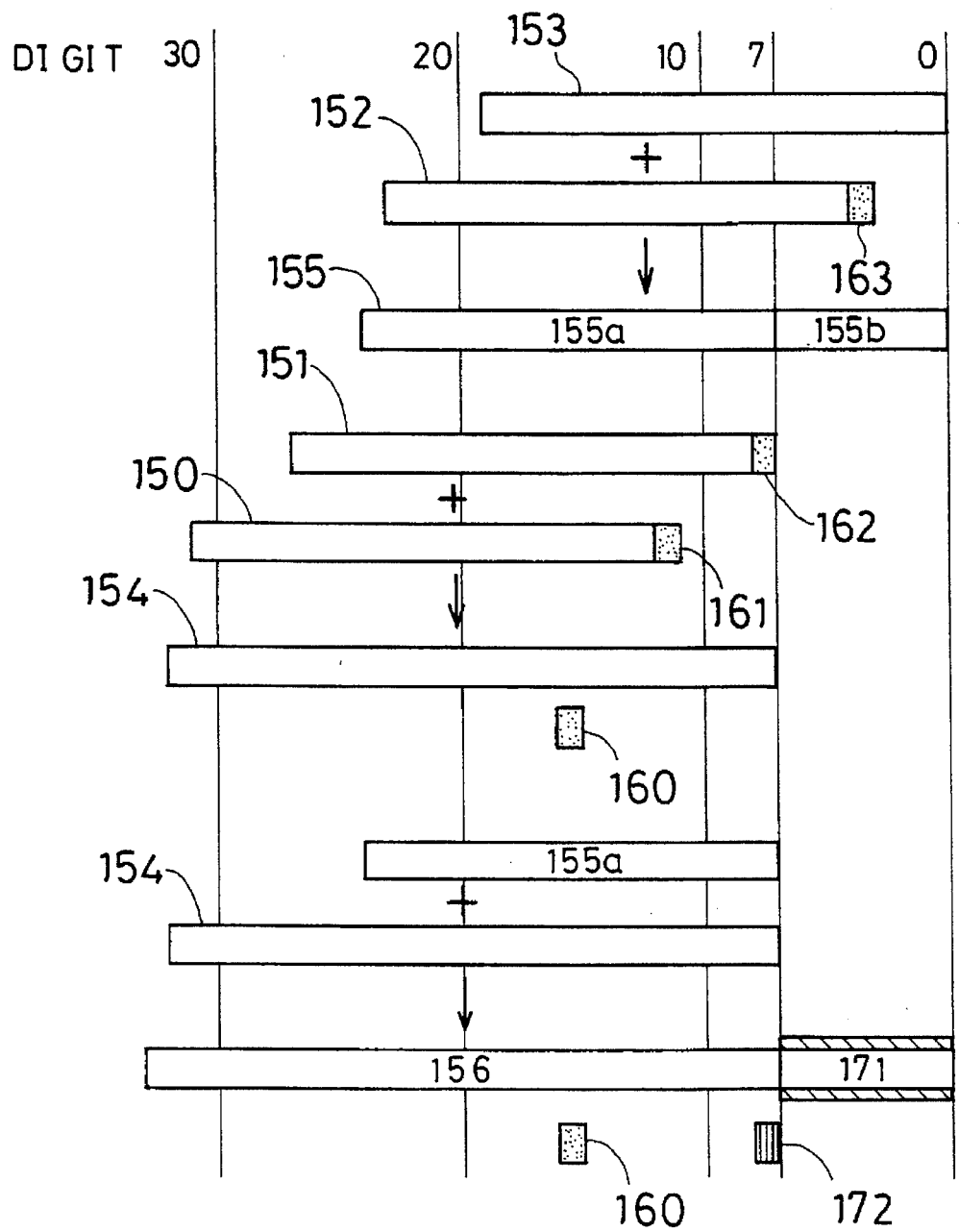
FIG. 9 is an explanatory drawing showing a relation of partial product addition in case of execution of a multiplication instruction in the third embodiment.

In FIGS. 8 and 9, based on source operands (X, Y) respectively inputted in first and second input latches 10, 11, the first PPG array 30 generates a first partial product 150 and a first supplementary term 160, the second PPG array 31 generates a second partial product 151 and a second supplementary term 161, and third and fourth PPG arrays 32, 33 generate respectively third and fourth partial products 152, 153 and third and fourth supplementary terms 162, 163. The partial products 150–153 are shifted by several digits one another, and the first supplementary term 160 is positioned at the most significantly of the supplementary terms 160–163.

The first RBA array 20 adds first and second partial products 150,151 and second and third supplementary terms 161, 162 to generate a first redundant binary added result (hereinafter referred to as RB added result) 154. As well, the second RBA array 21 adds the third partial product 152, the fourth partial product 153 and the fourth supplementary term 163 to generate a second RB added result 155.

Subsequently, the third RBA array 22 receives, via first and second RB accumulation part input selectors 53, 54 respectively, and adds the first RB added result 154 and a digit part 155a by the least significant digit of the first RB added result 154 in the second RB added result 155 to generate a third RB added result 156 of the thus added result. Simultaneously, the partial conversion part 70 receives a digit part 155b lower than the most significant digit of the first RB added result 154 in the second RB added result 155 via the partial conversion part input selector 56 to convert the redundant binary numeral of the digit part 155b into a binary numeral, thus generated are a conversion result 171 and a carry 172.

Next, the RB/B conversion part 4 receives the third RB added result 156 via the RB/B conversion part input selector 51 and receives the carry 172 generated by the partial conversion part 70 to convert the redundant binary numeral thereof into a binary numeral, using the first supplementary term 160 generated by the first PPG array 30.

The binary numeral (upper digit side of the multiplied result) converted by the RB/B conversion part 4 and the converted result 171 (lower digit side of the multiplied result) generated by the partial conversion part 70 are supplied to the output latch 16.

Figure 10:
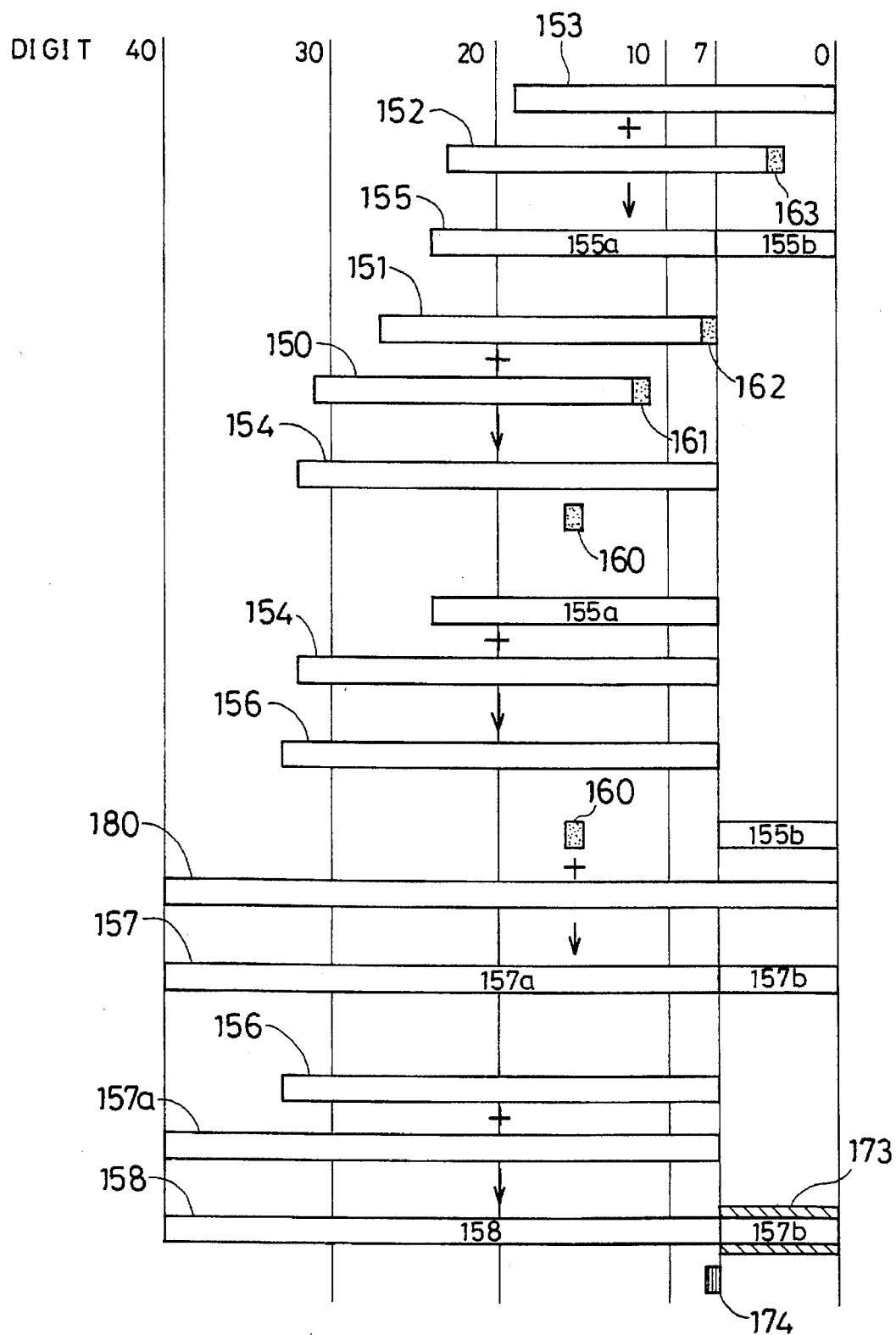
FIG. 10 is an explanatory drawing showing a relation of partial product addition in case of execution of a product-sum operation instruction in the third embodiment.

Next discussed is a case of successive product-sum operation in N times, with reference to FIGS. 8 and 10. The value A in the equation (3) is selective from "0", the value of the accumulation result intermediate latch 15 and the value of the output latch 16 according to the instruction.

In case of the product-sum operation instruction, following operations are repeated in N times per every clock cycle at a stage 1. First, based on source operands (Xi, Yi) (i=0–N–1) respectively inputted in first and second input latches 10, 11, first to fourth PPG arrays 30–33 respectively generate first to fourth partial products 150–153 and first to fourth supplementary terms 160–163, then the first RBA array 20 adds first and second partial products 150, 151 and second and third supplementary terms 161, 162 to generate the first RB added result 154, and the second RBA array 21 adds the third partial product 152, the fourth partial product 153 and the fourth supplementary term 163 to generate the second RB added result 155.

A Stage 2 next to the stage 1 starts one-clock behind the stage 1. In first-time operation (i=0) in the stage 2, the first RB added result 154 and the upper digit part 155a upper than the least significant digit of the first RB added result 154 in the second RB added result 155 are inputted to the third RBA array 22 respectively via first and second RB accumulation part input selectors 53, 54 and added to be the third RB added result 156. Simultaneously, the lower digit part 155b lower than the least significant digit of the first RB added reset 154 in the second B added result 155 is inputted to the fourth RBA array 23 via the second RB accumulation part input selector 54, and the first supplementary term 160 and the output of the output latch 16 as a value to be accumulated (equivalent to A in the equation (1)) via the third RB accumulation part input selector 55 are also inputted to and added in the fourth RBA array 23 to be the fourth RB added result 157. Then, the fifth RBA array 24 receives the third RB added result 156 and the fourth RB added result 157a, and adds the third RB added result 156 and the upper digit part 157a upper than the least significant digit of the third RB added result 156 in the fourth RB added result 157 to generate the fifth RB added result 158. The fifth RB added result 158 and the lower digit part 157b of the fourth RB added result 157 are latched by the accumulation result intermediate latch 15.

Next, in the second-time operation and the operations thereafter in the stage 2 (i=1–N–2), the output of the accumulation result intermediate latch 15 is selected as the value 180 to be accumulated which is inputted to the fourth RBA array 23 via the third RB accumulation part input selector 55. Each operation of third to fifth RBA arrays 22–24 is the same as in the first-time operation. Accordingly, the partial conversion part 70 does not work in the above operations.

In the N-th-time operation (i=N–1), different from the second-time operation and the operations thereafter, the upper digit part 157a upper than the least significant digit of the third RB added result 156 in the fourth RB added result 157 generated by the fourth RBA array 23 is inputted to the fifth RBA array 24 and added to the third RB added result 156 to be the fifth RB added result, and the lower digit part 157b of the fourth RB added result 157 is supplied to the partial conversion part 70 via the partial conversion part input selector 56 and is converted from the redundant binary numeral into a binary numeral, so that the binary converted result 173 and the carry 174 thereof are generated.

Then, in the stage 3, the fifth added result 158 is inputted to the RB/B conversion part 4 via the RB/B conversion part input selector 51 and the carry 174 of the binary converted result 173 is also inputted to the RB/B conversion part 4, so as to be converted into a binary numeral. The thus converted result is supplied together with the binary converted result 173 to the output latch 16.

In the product-sum arithmetic processor in the third embodiment, accordingly, in the multiplication, the lower digit part 155b of the added result 155 is already determined as the lower digit part of the multiplied result of the source operands (X, Y) when the RBA added results 154, 155 are generated respectively in the two RBA arrays 20, 21 of the multiplication partial processing part 20, and the redundant binary/binary conversion of the lower digit part 155b is executed by the partial conversion part 70 at an early stage prior to that the digits of the multiplied result of the source operands (X, Y) are all determined, namely concurrently with the addition of the upper digit part 155a of the RBA added result 155 and the RBA added result 154 by the RBA array 22. Thus, the digits that the RB/B conversion part 4 executes the redundant binary/binary conversion is reduced in number by the redundant binary/binary conversion by the partial conversion part 70, so that the redundant binary/binary conversion is completed early, thus speeding up the execution of the multiplication instruction.

In the product-sum operation, when the RBA accumulation results 156, 157 are generated respectively by the two RBA arrays 22, 23 of the RB accumulation part 3 at N-th time (last time), the lower digit part 157b of one 157 of the accumulation results 157, 156 is already determined as the lower digit part of the accumulation result. The redundant binary/binary conversion for the lower digit part 157b is executed by the partial conversion part 70 at an early stage prior to that the digits of the accumulation result are all determined, namely concurrently with the addition of the upper digit part 157a of the RBA accumulation result 157 and the RBA accumulation result 156 by the RBA array 24. Consequently, the digits that the RB/B conversion part 4 converts the redundant binary numeral into the binary numeral are reduced in number by the redundant binary/binary conversion by the partial conversion part 70, so that the redundant binary/binary conversion is completed early, thus speeding up the execution of the product-sum operation instruction.

Further, since the number of the RBA arrays 20–24 is five, the construction is simplified, compared with the RBA arrays 20–25 (six in number) in FIG. 3.

In the third embodiment, accordingly, in addition to the effect in the second embodiment, the operation time is further reduced, reducing the number of the effectively working gates.

In the first embodiment, the RBA accumulation array 26 is the redundant binary adder, but may be a carry save adder.

In the second embodiment, the RB multiplication part 1 and the RB/B conversion part can compose a high speed multiplier.

In the third embodiment, instead that the RBA arrays 20–24 are reduced in number to five, the partial conversion part 70 is provided. However, the partial conversion part 70 may be provided to the construction (six RBA arrays 20–25) of the second embodiment shown in FIG. 3.

We claim:

1. An arithmetic processor, comprising:
   a redundant binary multiplication part for generating a plurality of redundant binary partial products and a plurality of supplementary terms from a multiplicand and a recode value of a Booth multiplier relating to a multiplier factor, and for adding the redundant binary partial products and the supplementary terms until the addition results in one redundant binary multiplication result and one supplementary term; and
   a redundant binary/binary conversion part of generating propagations and generations of the redundant binary multiplication result, a digit part of which is positioned higher than a digit of the one supplementary term finally generated in the redundant binary multiplication part, in accordance with the value of the supplementary term, and for redundant binary/binary converting an output of the redundant binary multiplication part, using the thus generated propagations and generations.

2. The arithmetic processor of claim 1, further comprising an accumulation part arranged between the redundant binary multiplication part and the redundant binary/binary conversion part,
   wherein the accumulation part is connected at an input side thereof to an output side of the redundant binary multiplication part and an output side of the redundant binary/binary conversion part and is connected at an output side thereof to an input side of the redundant binary/binary conversion part, and
   the accumulation part adds a redundant binary multiplication result by the redundant binary multiplication part and an accumulated result that is an output of the redundant binary/binary conversion part in which a previous added result by the accumulation part is redundant binary/binary converted.

3. An arithmetic processor, comprising:
   a redundant binary multiplication part for generating a plurality of redundant binary partial products and a plurality of supplementary terms from a multiplicand and a recode value of a Booth multiplier relating to a multiplier factor, and for adding the redundant binary partial products and the supplementary terms until the addition results in one redundant binary multiplication result and one supplementary term;
   a path for fetching out a partial product added result on lower digit side which is obtained by adding a plurality of redundant binary partial products generated from a lower digit part of a multiplier factor and a multiplicand in the redundant binary multiplication part; and a partial product added result on upper digit side which is obtained by adding a plurality of redundant binary partial products generated from the upper part of the multiplier factor and the multiplicand;
   first, second and third intermediate latches for storing the lower-digit-side and upper-digit-side partial product added results and the finally generated one supplementary term;
   an accumulation result latch;
   a redundant binary accumulation part for accumulating results of the first to third intermediate latches and a value of said accumulation result latch and for storing the thus accumulated result into said accumulation result latch;
   a selector for selecting one of a result of said redundant binary multiplication part and a result of said redundant binary accumulation part; and
   a redundant binary/binary conversion part for generating propagations and generations of a redundant binary multiplication result a digit part of which is positioned higher than a digit of the one supplementary term finally generated in the redundant binary multiplication part, based on the value supplied via the selector, and converting the selected result into a binary number, using the thus generated propagations and generations.

4. An arithmetic processor of claim 3, wherein the non-pipeline operation is executed when a multiplication instruction is executed and a pipeline operation is executed when a product-sum operation instruction is executed, said non-pipeline operation comprising the steps of:
   generating a plurality of redundant binary partial products and plurality of supplementary terms from a multiplicand and a recode value of a Booth multiplier relating to a multiplier factor;
   obtaining one pair of redundant binary multiplication results and one supplementary term by adding the redundant binary partial products and the supplementary terms;
   selecting a result by the redundant binary multiplication part;
   generating propagations and generations of the thus selected redundant binary multiplication result, based on the finally generated one supplementary term; and
   redundant binary/binary converting the thus selected result of the redundant binary multiplication part by adding the propagations and the generations, and
   said pipeline operation comprising the steps of:
   outputting, in a first stage a partial product added result on lower digit side obtained by adding a plurality of redundant binary partial products generated from a lower digit part of the multiplier factor and a multiplicand, a partial product added result on upper digit side obtained by adding a plurality of redundant binary partial products generated from an upper digit part of the multiplier factor and the multiplicand, and one supplementary term;

conducting, in a second stage, a redundant binary addition of the lower-digit-side partial product added result, the upper-digit-side partial product added result, the one supplementary term and a past accumulated value in redundant binary number to obtain a present accumulated result in redundant binary number;

repeating the multiplication and the accumulation in the respective first and second stages by a number of times specified to the product-sum operation instruction;

selecting, in a third stage, a redundant binary accumulated result finally obtained after the accumulation at the times specified by the product-sum operation instruction; and converting the thus selected redundant binary accumulation result into a binary number.

5. The arithmetic processor of either of claims 1, 2 or 3, wherein said redundant binary/binary conversion part comprises:

a first adder for executing an arithmetic processing a redundant binary input from a one-digit lower than the digit of the supplementary term at a most significant digit to a least significant digit;

a pg generation part for calculating a propagation and a generation regarding a value of the supplementary term at the most significant digit and upper digits thereof; and a second added for executing an addition, using an output of said pg generation part and a carry signal from said first adder.

6. The arithmetic processor of claim 5, wherein the redundant binary numeral is composed of a combination of a positive output and a negative output, and said first adder executes a subtraction of the redundant binary input from a one-digit lower than the digit of the supplementary term at the most significant digit to the least significant digit.

7. The arithmetic processor of claim 5, wherein the redundant binary numeral is composed of an absolute value and a sign, and said pg generation part comprises a pg generation cell at an arbitrary digit, i-th digit, positioned upper than a most significant digit of the supplementary term in the redundant binary numeral, for using a logical product of an absolute value at the i-th digit and an inversion of a sign at i-1-th digit as an intermediate carry, using an exclusive logical sum of the absolute value at the i-th digit and the inversion of the sign of the i-1-th digit as an intermediate sum, using a logical product of the intermediate sum at the i-th digit and the intermediate carry at i-1-th digit as a generation, and using an exclusive logical sum of the intermediate sum at the i-th digit and the intermediate carry at i-1-th digit as a propagation.

8. The arithmetic processor either of claims 1, 2 or 3, wherein the supplementary term generated by said redundant binary multiplication part is composed of an absolute value and a sign, and said redundant binary/binary conversion part comprises a conversion selection signal generating part for converting the supplementary term generated by said redundant binary multiplication part into a plurality of selection signals, and calculates a propagation and a generation, using the plural selection signals converted by said conversion selection signal generating part.

9. The arithmetic processor of either of claims 1, 2 or 3, wherein a redundant binary numeral is composed of an absolute value and a sign, and said pg generation part comprises a pg generation cell at j-th digit where the supplementary term at a most significant digit is positioned, for using an exclusive logical sum of an absolute value at the j-th digit and the absolute value of said supplementary term as a generation gi and 1 as a propagation pj, for using, when the supplementary term is 1, an inversion of the absolute value at the j-th digit as an intermediate carry and the sign at the j-th digit as the sign at the j-th digit, for using, when the supplementary term is 0, 1 as the intermediate carry and the sign at the j-th digit as the sign at the j-th digit, and for using, when the supplementary term is $-1$, an inversion of a product of the absolute value at the j-th digit and an inversion of the sign at the j-th digit as an intermediate carry and 1 as the sign at the j-th digit.

10. The arithmetic processor of either of claims 1, 2 or 3, wherein said redundant binary/binary conversion part comprises a redundant binary/binary partial conversion part, which receives a part from a least significant digit up to a set digit of the redundant binary multiplied results generated by said redundant binary multiplication part, for converting the part thereof from the redundant binary numeral into a binary numeral.

11. An arithmetic method for executing a nonpipeline operation in an arithmetic processor when a multiplication instruction is executed and a pipeline operation when a product-sum operation instruction is executed, said nonpipeline operation comprising the steps of:

generating a plurality of redundant binary partial products and plurality of supplementary terms from a multiplicand and a recode value of a Booth multiplier relating to a multiplier factor;

obtaining one pair of redundant binary multiplication results and one supplementary term by adding the redundant binary partial products and the supplementary terms;

selecting a result by the redundant binary multiplication part;

generating propagations and generations of the thus selected redundant binary multiplication result, based on the finally generated one supplementary term; and redundant binary/binary converting the thus selected result of the redundant binary multiplication part by adding the propagations and the generations, and said pipeline operation comprising the steps of:

outputting, in a first stage, a partial product added result on lower digit side obtained by adding a plurality of redundant binary partial products generated from a lower digit part of the multiplier factor and a multiplicand, a partial product added result on upper digit side obtained by adding a plurality of redundant binary partial products generated from an upper digit part of the multiplier factor and the multiplicand, and one supplementary term;

conducting, in a second stage, a redundant binary addition of the lower-digit-side partial product added result, the upper-digit-side partial product added result, the one supplementary term and a past accumulated value in redundant binary number to obtain a present accumulated result in redundant binary number;

repeating the multiplication and the accumulation in the respective first and second stages by a number of times specified in the product-sum operation instruction;

selecting, in a third stage, a redundant binary accumulated result finally obtained after the accumulation at the times specified by the product-sum operation instruction; and converting the thus selected redundant binary accumulated result into a binary number.

12. An arithmetic processor for performing multiplication, comprising:

a redundant binary partial multiplication part for outputting a partial product added result on lower digit side obtained by adding a plurality of redundant binary partial products generated from a multiplicand and a recode value of a Booth multiplier reacting to a lower digit part of a multiplier factor; a partial product added result on upper digit side obtained by adding a plurality of redundant binary partial products generated from the multiplicand and a recode value of the Booth multiplier relating to an upper digit of the multiplier factor; and a supplementary term of a redundant binary partial product of a most significant digit among the plurality of redundant binary partial products;

an accumulation part for adding a digit part of the lower-digit-side partial product added result which overlaps digits of the upper-digit-side partial product added result and the upper-digit-side partial product added result;

a redundant binary/binary partial conversion part for redundant binary/binary converting a digit part of the lower-digit-side partial product added result which does not overlap digits of the upper-digit-side partial product added result;

a redundant binary/binary conversion part for generating propagations and generations of an accumulated result by the accumulation part based on the supplementary term generated by the binary redundant partial multiplication part, and for redundant binary/binary converting the accumulated result by the accumulation part, using the thus generated propagations and generations.

13. The arithmetic processor of claim 12, wherein said accumulation part performs a first addition the digit part of the lower-digit-side partial product added result generated by the redundant binary multiplication part which does not overlap the digits of the upper-digit-side partial product added result, the supplementary term generated by the redundant binary multiplication part and an accumulated result, the accumulation part also performs another addition of the first added result and an added result of the digit part of the lower-digit-side partial product added result which overlaps the digits of the upper-digit-side product added result and the upper-digit-side partial product added result, an added result of the other addition by the accumulation part is used as the accumulated result, whereby the arithmetic processor has a function of redundant binary/binary converting the digit part of the first added result by the accumulation part which is positioned lower than a least significant digit of the added result of the other addition by the accumulation part, the redundant binary/binary conversion part also has a product-sum operation function of generating propagations and generation, ignoring the supplementary term generated by the redundant binary partial multiplication part and the redundant binary/binary conversion part converting the added result of the other addition by the accumulation part, using the thus generated propagations and generations.

14. The arithmetic processor of claim 13, further comprising:

a first selector for selecting to output one of the added result of the digit part of the lower-digit-side partial product added result generated by the redundant binary partial multiplication part which overlaps the digits of the upper-digit-side partial product added result and the upper-digit-side partial product added result, and the accumulated result; and a second selector for selecting to output into the redundant binary/binary partial conversion part one of the digit part of the lower-digit-side partial product added result which does not overlap the digits of the upper-digit-side partial product added result and a digit part of the first added result by the accumulation part which is positioned lower than the least significant digit of the added result of the other addition by the accumulation part, wherein the first selector is connected at an output side of the accumulation part, and the second selector is connected at an output side thereof to the redundant binary/binary partial conversion part.

15. The arithmetic processor of either of claims 12, 13 or 14, wherein said redundant binary/binary partial conversion part comprises an adder for inputting a sign and an absolute value of a redundant binary numeral and for executing an addition, using a logical negation of the absolute value as a propagation and a logical product of a logical negation of the sign and the absolute value as a generation, based on the propagation and the generation.

16. In an arithmetic processor, a method for executing a multiplication instruction in a nonpipeline operation, comprising the steps of:

outputting three of: a partial product added result on lower digit side obtained by adding a plurality of redundant binary partial products generated from a multiplicand and a recode value of a Booth multiplier reacting to a lower digit part of a multiplier factor; a partial product added result on upper digit side obtained by adding a plurality of redundant binary partial products generated from a multiplicand and a recode value of the Booth multiplier relating to an upper digit of the multiplier factor; and a supplementary term of a redundant binary partial product of a most significant digit among the plurality of redundant binary partial products;

adding a digit part of the lower-digit-side partial product added result which overlaps digits of the upper-digit-side partial product added result and the upper-digit-side partial product added result, in parallel with conversion of a digit part of the lower-digit-side partial product added result which does not overlap digits of the upper-digit-side partial product added result from redundant binary number into binary number;

generating propagations and generations of the thus added result based on the supplementary term of the redundant binary partial product having the most significant digit; and redundant binary/binary converting the thus generated propagations and generations.

17. An arithmetic method executed by an arithmetic processor comprising the steps of:

outputting, in a first stage, three of: a lower-digit-side partial product added result obtained by adding a plurality of redundant binary partial products generated from a multiplicand and a recode value of a Booth multiplier relating to a lower digit part of a multiplier factor; an upper-digit-side partial product added result obtained by adding a plurality of redundant binary partial products generated from a multiplicand and a recode value of the Booth multiplier relating to an upper digit part of a multiplier factor; and a supplementary term of a redundant binary partial product having a most significant digit among the plurality of redundant binary partial products;

accumulating in redundant binary number, in a second stage, the lower-digit-side partial product added result, the upper-digit-side partial product added result, the supplementary term and a past accumulated value;

repeating the first and second stages in a pipeline operation;

redundant binary/binary converting, in a third stage, the added result obtained by a final accumulation in the second stage, wherein in the second stage at the final accumulation, a digit part of the lower-digit-side partial product added result which overlaps digits of the upper-digit side partial product added result, the upper-digit-side partial product added result, the supplementary term and the past accumulated value are accumulated by redundant binary number, in parallel with the redundant binary/binary conversion of the digit part of the lower-digit-side partial product added result which does not overlap the digits of the upper-digit-side partial product added result.

* * * * *

UNITED STATES PATENT AND TRADEMARK OFFICE
CERTIFICATE OF CORRECTION

PATENT NO. : 5,636,155
DATED : June 3, 1997
INVENTOR(S) : Hideyuki Kabuo

It is certified that error appears in the above-identified patent and that said Letters Patent is hereby corrected as shown below:

Claim 9, line 13, delete "gi" and insert --gj--.

Claim 13, line 2, after "addition" insert --of--.

Claim 17, line 3, delete ", three of:".

Signed and Sealed this

First Day of February, 2000

Q. TODD DICKINSON

*Attest:*

*Attesting Officer*          *Acting Commissioner of Patents and Trademarks*